United States Patent

Tamura

(10) Patent No.: US 6,576,827 B2
(45) Date of Patent: Jun. 10, 2003

(54) MUSIC SOUND SYNTHESIS WITH WAVEFORM CACHING BY PREDICTION

(75) Inventor: Motoichi Tamura, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 10/098,670

(22) Filed: Mar. 14, 2002

(65) Prior Publication Data

US 2002/0134222 A1 Sep. 26, 2002

(30) Foreign Application Priority Data

| Mar. 23, 2001 | (JP) | ..................................... 2001-086163 |
| Mar. 23, 2001 | (JP) | ..................................... 2001-086164 |
| Mar. 23, 2001 | (JP) | ..................................... 2001-086165 |
| Mar. 23, 2001 | (JP) | ..................................... 2001-086166 |

(51) Int. Cl.[7] ............................. G10H 1/06; G10H 7/00
(52) U.S. Cl. ..................................................... 84/622
(58) Field of Search .................... 84/603–607, 622–625

(56) References Cited

U.S. PATENT DOCUMENTS

| 4,508,001 A | 4/1985 | Suzuki |
| 5,463,183 A | 10/1995 | Konno |
| 5,698,802 A | * 12/1997 | Kamiya ..................... 84/622 X |
| 5,753,841 A | * 5/1998 | Hewitt .......................... 84/604 |
| 5,955,691 A | * 9/1999 | Suzuki et al. ................. 84/604 |
| 6,008,446 A | * 12/1999 | Van Buskirk et al. ........ 84/603 |

FOREIGN PATENT DOCUMENTS

JP 63-181188 7/1988

* cited by examiner

*Primary Examiner*—Jeffrey Donels
(74) *Attorney, Agent, or Firm*—Morrison & Foerster LLP

(57) ABSTRACT

A method and apparatus for synthesis of sound. One method for synthesis of musical sound includes receiving a stream of packets including a preceding packet and a succeeding packet for reproducing the musical sound continuously along a time axis. Each packet contains identification information effective to specify vector data stored in a first storage device. According to the identification information in the preceding packet, vector data of the succeeding packet is predicted. The predicted vector data is transferred from the first storage device to a second storage device before the succeeding packet is received such that the predicted vector data can be cached in the second storage device. The cached vector data is retrieved from the second storage device when the succeeding packet is received and the identification information contained therein hits the cached vector data to thereby synthesize the musical sound.

28 Claims, 29 Drawing Sheets

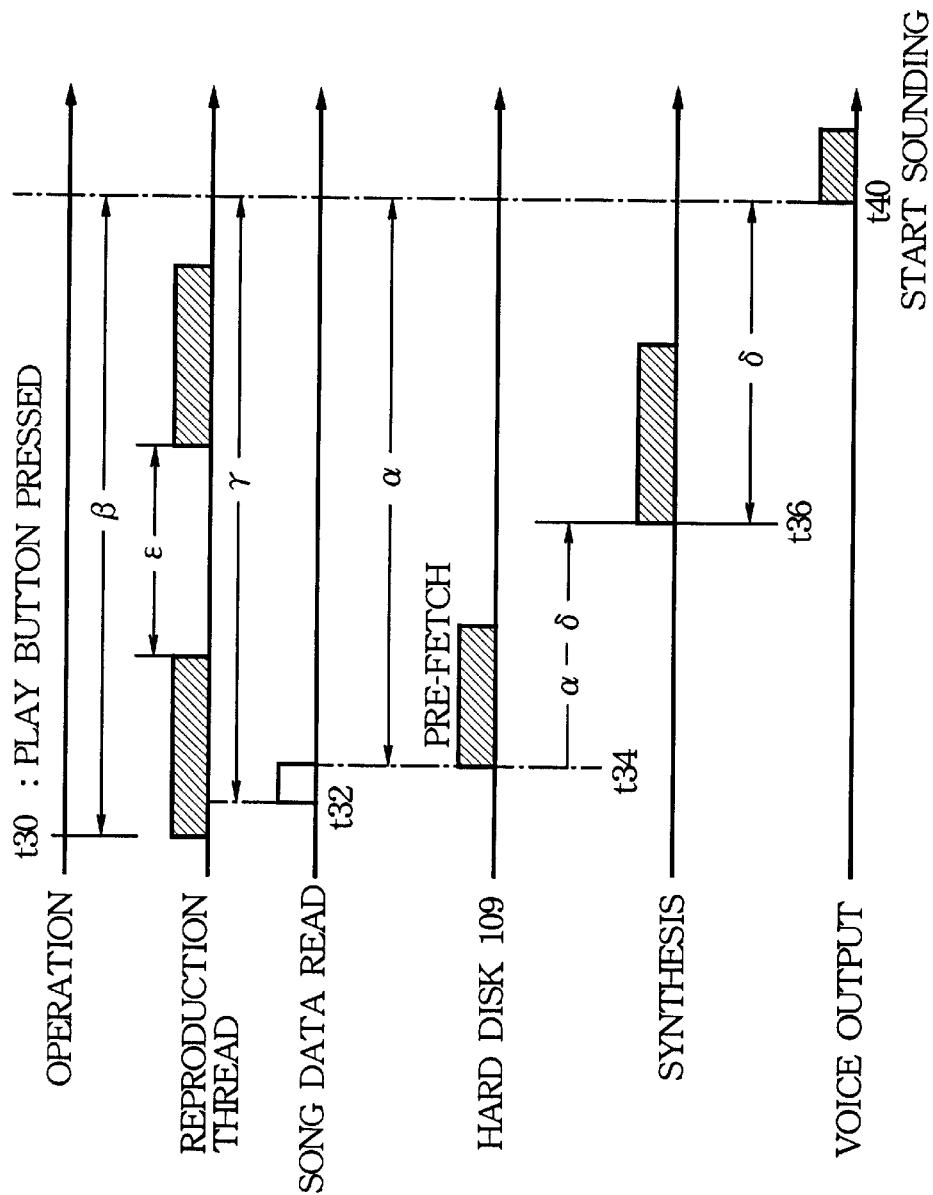

MUSIC SOUND SYNTHESIS WITH WAVEFORM CACHING BY PREDICTION

BACKGROUND OF THE INVENTION

The present invention relates to a sound data transfer method, a sound data transfer apparatus, and a program thereof for generating musical sounds, voices, and any other sounds based on reading of waveform data from a relatively low-speed storage medium such as a hard disk, which has a relatively slow access rate to stored data. More particularly, the present invention relates to generation or synthesis of waveforms which faithfully express a timbre of musical sound in response to performer's various performance styles or articulation characteristic of natural musical instruments. The present invention is widely applicable to not only electronic musical instruments, but also devices, apparatuses or methods in all fields having a capability of generating musical sounds, voices or any other sounds such as mechanical instruments, computers, electronic game apparatuses and other multimedia devices. In this specification, a musical sound waveform is not limited to the pure musical sense, but may include a waveform of a voice or any sound.

There is widely known the "waveform memory reading" technology which stores waveform data (i.e., waveform sample data) encoded with any encoding system such as PCM (pulse code modulation), DPCM (differential PCM) and ADPCM (adaptive differential PCM), and which reads the stored data according to desired musical pitches to generate or synthesize a musical sound. Further, there are known various types of "waveform memory reading system" technologies. Most conventional "waveform memory reading system" technologies are used to generate a waveform of a single sound from the beginning to the end of sounding duration. One example is to store waveform data of a whole waveform of a sound from the beginning to the end of the sounding duration. Another example is to store waveform data of a partial at an attack portion of the sound with complicated changes and to store a specified loop waveform of a subsequent part at a sustain portion with little changes. In this specification, the term "loop waveform" signifies a waveform which is read repeatedly in a loop.

As means for storing waveform data, there are known ROM, RAM, hard disks, CD-ROM, etc. A hard disk and CD-ROM provide a low unit price per unit storage capacity and are suited for storing a great amount of data. However, the hard disk and CD-ROM offer a slow and unstable access speed, incapable of immediately reading necessary waveform data just at the timing of outputting a musical sound signal. For this reason, the following technologies are proposed.

Japanese Patent Unexamined Publication No. Hei. 6-308964 corresponding to the U.S. Pat. No. 5,463,183 discloses the technology of preliminarily transferring to RAM a beginning portion of a plurality of waveform data stored in a hard disk. Namely, when a sounding instruction is supplied, an operation starts advance reading of a succeeding portion of the pertinent waveform data from the hard disk, and concurrently reproducing the beginning portion of the data previously stored in RAM. After the operation completes the reproduction of the beginning portion of the data, the succeeding portion of the waveform data is reproduced.

Japanese Patent Unexamined Publication No. Sho. 63-181188 discloses the technology of reproducing waveform data by sequentially reading. Waveform data to be sequentially sounded is predefined as sequence data. This technology predetermines the time to start reading of each waveform data corresponding to a sequence timing so that the start time becomes earlier than the note-on timing.

SUMMARY OF THE INVENTION

However, the technology according to Japanese Patent Unexamined Publication No. Hei. 6-308964 needs to previously transfer beginning portions of all waveform data to RAM, thereby hindering the efficient use of the precious RAM. Since the technology according to Japanese Patent Unexamined Publication No. Sho. 63-181188 is based on the assumption that a musical sound signal is generated nonrealtime, it is impossible to apply this technology to a case where music sequence data is supplied realtime.

The present invention has been made in consideration of the foregoing. It is therefore a first object of the present invention to provide a sound data transfer method, a sound data transfer apparatus, and a program thereof for efficiently and extensively using RAM and for realtime generating a musical sound signal concurrently by using a hard disk etc.

The technology according to Japanese Patent Unexamined Publication No. Hei. 6-308964 needs to previously transfer beginning portions of all waveform data to RAM. The technology according to Japanese Patent Unexamined Publication No. Sho. 63-181188 always requires a hard disk to be accessed for every event, thereby increasing a noise from the hard disk and shortening the life thereof. In addition, frequent accessing of the hard disk consumes extra resources, which should be allocated to other processes.

The present invention has been made in consideration of the foregoing. It is therefore a second object of the present invention to provide a sound data transfer method, a sound data transfer apparatus, and a program thereof for decreasing unnecessary accesses to a hard disk etc.

Conventionally, the "waveform memory reading system" technology stores waveform data of a whole waveform of one sound from the beginning to the end of the sounding duration, or stores waveform data of a part of one sound as an attack portion. Such technology must store a great number of various waveform data corresponding to various playing styles (or articulations), requiring a huge storage capacity for storing these diverse waveform data.

The aforementioned system for storing waveform data of the whole waveform can faithfully express timbre variations due to various playing styles (or articulations) specific to natural musical instruments. However, such system may simply reproduce musical sounds just in accordance with the stored waveform data, providing limited controllability and editability. For example, it is very difficult to provide characteristics control such as timing axis control of waveform data corresponding to a desired playing style (or articulation) according to the musical performance data.

The present invention has been made in consideration of the foregoing. It is therefore a third object of the present invention to provide a waveform synthesis method, a sound data transfer apparatus, and a program thereof capable of easily, simply and realtime generating high-quality waveform data available for various playing styles (or articulations).

The technology according to Japanese Patent Unexamined Publication No. Hei. 6-308964 needs to previously transfer beginning portions of all waveform data of various timbres to RAM, thereby sacrificing the RAM utilization. Further, the technology according to Japanese Patent Unexamined Publication No. Sho. 63-181188 always requires a hard disk to be accessed for every event, thereby increasing a noise from the hard disk and shortening the life thereof. In addition, frequent accessing of the hard disk scarifies limited resources of a machine.

The present invention has been made in consideration of the foregoing. It is therefore a fourth object of the present invention to provide a sound data transfer method, a sound data transfer apparatus and a program thereof for saving accesses to a hard disk etc.

In order to achieve the first object, the present invention is characterized by having the following configurations. It should be noted that examples are parenthesized.

The configuration according to a first aspect of the invention is a sound data transfer method of using a low-speed storage device (hard disk 109) for storing sound data (vector data) of musical sound waveforms and a high-speed storage device (cache memory 44) for caching the sound data, and transferring a part of sound data stored in the low-speed storage device to the high-speed storage device. The method is characterized by having: a timbre specification reception process of receiving timbre specification (MIDI program change message) associated with sound data to be transferred to the high-speed storage device; a sound data prediction process (step S30) of predicting a candidate of sound data to be specified later based on the received timbre specification; and a process (step S43) for transferring the predicted sound data candidate to the high-speed storage device from the low-speed storage device.

Preferably, the sound data stored in the low-speed storage device includes first sound data corresponding to a sounding start portion (an attack portion) and second sound data corresponding to subsequent portions (a body portion) other than the sounding start portion, and sound data predicted according to the timbre specification is the first sound data. The method is characterized by further having: a first sound data specification reception process of receiving specification of any first sound data; a second sound data prediction process (step S30) of predicting a candidate of second sound data to be specified later based on the first sound data specification; and a process (step S43) for transferring the predicted second sound data to the high-speed storage device from the low-speed storage device.

Preferably, the sound data stored in the low-speed storage device further includes third sound data (a release portion or a joint portion) to be used after the first and second sound data. The method is characterized by further having: a second sound data specification reception process of receiving specification of any second sound data; a third sound data prediction process (step S33) of predicting a candidate of third sound data to be specified later based on the second sound data specification; and a process (step S43) for transferring the predicted third sound data to the high-speed storage device from the low-speed storage device.

Preferably, the inventive sound data transfer method further has a process of providing identification information (setting member dwStatus to 'USED') which is kept in the high-speed storage device upon receipt of any of the sound data specifications and indicates possibility of releasing a candidate of sound data with failed prediction.

Preferably, the inventive sound data transfer method further has a process of previously transferring basic sound data (substitutive page) to the high-speed storage device for every timbre prior to the timbre specification reception process. When sound data specified in the first, second, or third data specification reception process is not transferred to the high-speed storage device, the basic sound data is used instead of the specified sound data.

In order to achieve the aforementioned second object, the present invention is characterized by having the following configurations. It should be noted that examples are parenthesized.

The configuration according to a second aspect of the invention is a sound data transfer method of using a low-speed storage device (hard disk 109) for storing sound data (vector data) of musical sound waveforms and a high-speed storage device (cache memory 44) for caching the sound data, and transferring s part of the sound data stored in the low-speed storage device to the high-speed storage device for waveform synthesis. The method is characterized by having: a preparation process of preparing sound data determined to be used or predicted to be used (supplying a vector ID or a packet from a prediction control section 41 or a playing style synthesis section 101C to a prefetch section 42); a synthesis start instruction process of instructing to start synthesis by using sound data which is previously instructed for preparation and is stored in the high-speed storage device; a transfer process (steps S42 an S43) of, when the sound data instructed for preparation is not stored in the high-speed storage device, transferring the sound data to the high-speed storage device from the low-speed storage device and setting a count value (member dwCount) to an initial value corresponding to the transferred sound data; an increment process of, when the sound data instructed for preparation is already stored in the high-speed storage device, incrementing a count value (member dwCount) for the sound data; a waveform synthesis process of starting waveform synthesis by using the sound data according to the start instruction from the synthesis start instruction process and decrementing (FILLED state: prefetch at S64) a count value (member dwCount) associated with the used sound data; and a setup process of detecting sound data which is stored in the high-speed storage device and which is not scheduled to be used for a subsequent start instruction based on a count value corresponding to each sound data, and setting the detected sound data to an erasable state (shifting the FILLED state S64 to the USED state S63 when the member dwCount reaches "0").

Preferably, the inventive sound data transfer method is characterized by further having a prefetch process of prefetching event data from an event sequence (musical performance data) prior to a reproduction start time, where the preparation process determines sound data associated with a preparation instruction based on the prefetched event data, and thereby shares the transfer process among a plurality of event data for which common sound data is used.

Preferably, the inventive sound data transfer method is characterized by further having a process of setting a reproduction start time with a time lag from a time when event data is supplied. By such a manner, the preparation process can determine common sound data associated with a preparation instruction based on the sequentially supplied event data within the time lag, and thereby may share the transfer process among the plurality of event data for which the common sound data is used.

Preferably, the preparation process performs a plurality of the preparation instructions for the same sound data based on single event data; and the waveform synthesis process decrements the count value each time the sound data is used for the single event data.

In order to achieve the aforementioned third object, the present invention is characterized by having the following configurations. It should be noted that examples are parenthesized.

The configuration according to a third aspect of the invention is a waveform synthesis method characterized by having: an input process of receiving a packet stream comprising a plurality of packets including at least specification information (vector ID) about vector data stored in a low-speed storage device (hard disk 109) and timing information about waveform generation; a transfer process of transferring vector data specified by the specification information included in these packets from the low-speed storage device to a high-speed storage device, wherein the transfer process starts prior to a timing indicated by the timing information included in each packet; and a waveform synthesis process executed at the timing corresponding to the timing information in each packet for reproducing the vector data stored in the high-speed storage device and specified by each specification information in each of the packet and for synthesizing a waveform based on the reproduced vector data.

Preferably, the inventive waveform synthesis method is characterized by further comprising a process of determining whether or not vector data specified by the received packet is already stored in the high-speed storage device, wherein the transfer process is performed on the condition that specified vector data is not yet transferred to the high-speed storage device.

Preferably, the transfer process comprises: a process of determining whether or not there is a sufficient capacity for storing vector data to be newly transferred to the high-speed storage device; and a release process of, if the free capacity is insufficient, releasing a storage area of old vector data already used for waveform generation or of unused (unsuccessfully predicted) vector data so as to yield a free area (setting member dwStatus to 'FREE').

In order to achieve the aforementioned fourth object, the present invention is characterized by having the following configurations. It should be noted that examples are parenthesized.

The configuration according to a fourth aspect of the invention is a sound data transfer method of using a low-speed storage device (hard disk 109) for storing sound data (vector data) of musical sound waveforms and a high-speed storage device (cache memory 44) for caching the sound data, and transferring a part of sound data stored in the low-speed storage device to the high-speed storage device for waveform synthesis. The inventive method is characterized by having: a transfer process (step S43) of transferring sound data from the low-speed storage device to the high-speed storage device based on a sounding instruction (note-on); and a retention process of retaining the sound data, after the same is used for waveform synthesis, in the high-speed storage device in a state capable of use in the future (setting member dwStatus to 'USED').

Preferably, the transfer process transfers sound data from the low-speed storage device to the high-speed storage device in units of specified capacities (in units of memory blocks).

Preferably, the transfer process comprises: a process of detecting whether or not there is a sufficient capacity for storing sound data newly transferred to the high-speed storage device; a process of, if the free capacity is insufficient, releasing a storage area of previously retained sound data to create a free area (setting member dwStatus to 'FREE'); and a process of transferring sound data to be newly transferred to the free area.

Preferably, the sound data is used for waveform synthesis for each specified portion (module), and the method is characterized by further comprising: a process of arranging data management in the high-speed storage device so that sound data used at the beginning of each portion is not easily released in comparison with other sound data (a modification of adding vector data to be cached preferentially to the beginning of a linked list and inserting other vector data in the middle of the linked list).

BRIEF DESCRIPTION OF THE DRAWINGS

FIG. 31 is a timing chart which outlines the timing control for the aforementioned embodiment.

DETAILED DESCRIPTION OF THE INVENTION

1. Hardware Configuration According to Embodiments of the Invention

Embodiments of the present invention will be described in further detail with reference to the accompanying drawings.

Figure 1:
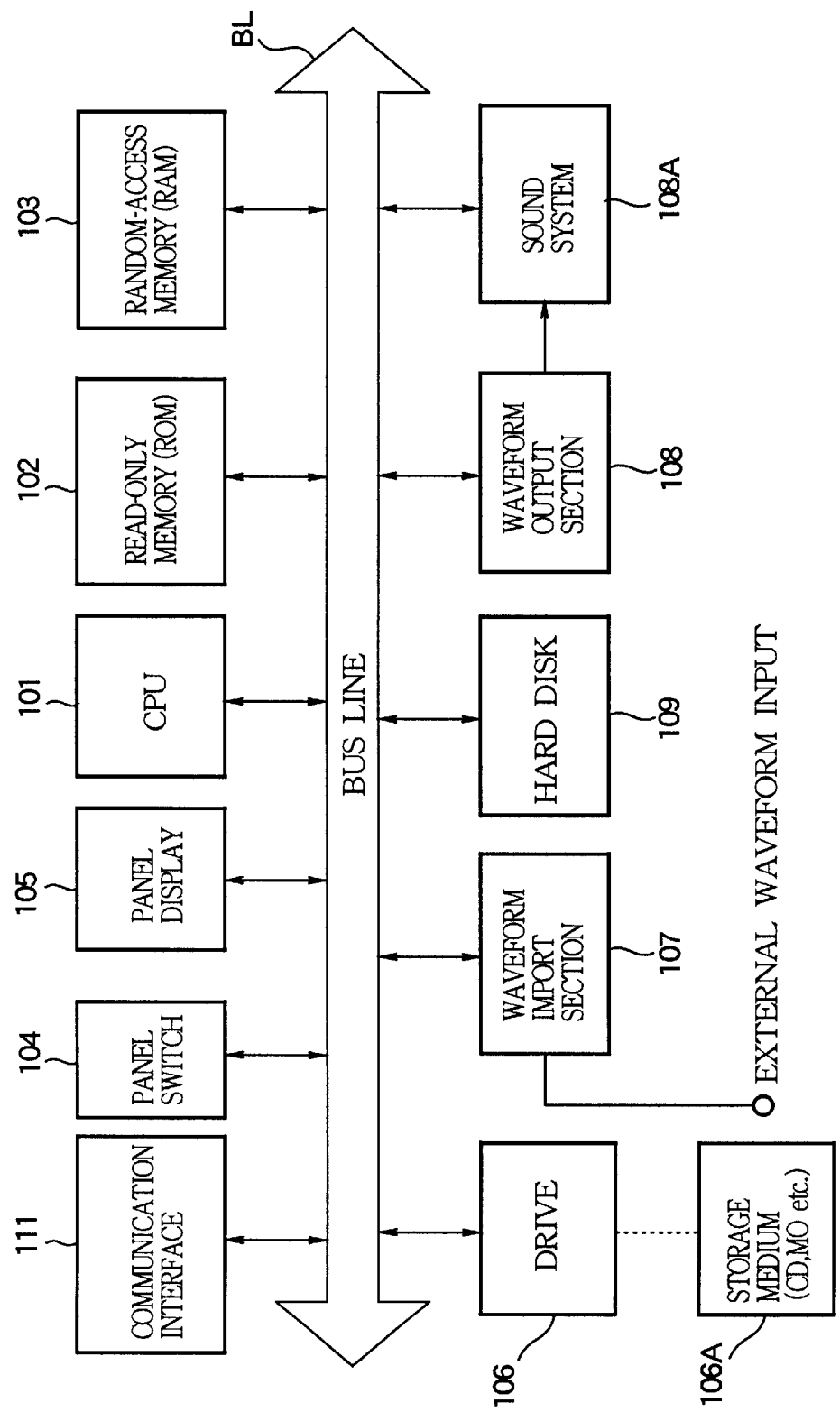
FIG. 1 is a block diagram for exemplifying a hardware configuration of the waveform generator according to the present invention.

FIG. 1 is a block diagram exemplifying the hardware configuration of a waveform generator according to the present invention. This hardware configuration example uses a computer. In this configuration, the computer executes a specified program (software) to implement the waveform generation according to the present invention. Of course, the waveform generation is not limited to the form of computer software, but is also available in the form of a microprogram processed by a DSP (digital signal processor). Further, the waveform generation is not limited to the form of these types of programs, but is also available in the form of dedicated hardware configured to include discrete circuits, integrated circuits, large-scale integrated circuits, etc. The waveform generator may be applicable to any products such as electronic musical instruments, karaoke apparatuses, electronic game apparatuses, other multimedia devices, personal computers, etc.

In the hardware configuration example in FIG. 1, a CPU 101 functions as a main control section of the computer. Via a bus line BL (data or address bus, etc.), the CPU 101 is connected to read-only memory (ROM) 102, random access memory (RAM) 103, a panel switch 104, a panel display 105, a drive 106, a waveform import section 107, a waveform output section 108, a hard disk 109, and a communication interface 111. The CPU 101 performs processing such as "creation of a waveform database", "musical sound synthesis (software sound source based on a created database", etc. (to be described) based on specified programs. These programs are supplied from networks via the communication interface 111 or external storage media 106A etc. such as CD, MO, etc. mounted on the drive 106 and are stored in the hard disk 109. At the time of execution, the programs are loaded from the hard disk 109 to the RAM 103. Alternatively, it may be preferable to record programs in the ROM 102. The ROM 102 stores various programs, data, etc. executed or referenced by the CPU 101. The RAM 103 is used as working memory for temporarily storing various information about a musical performance or various data generated when the CPU 101 executes a program. The RAM 103 is also used as memory for storing currently executing programs or related data. Specific address areas in the RAM 103 are allocated to associated functions and are used as registers, flags, tables, memory, etc. The panel switch 104 is configured to include various operation devices for issuing instructions to sample musical sounds, editing sampled waveform data, etc., entering various information, etc. The operation devices include a numeric keypad for entering numeric data, a keyboard for entering character data, panel switches, etc. Further, it may be preferable to include various operation devices for selecting, setting, or controlling pitches, timbres, effects, etc. The panel display 105 displays various information entered from the panel switch 104 or sampled waveform data, etc. For example, a liquid crystal display (LCD), CRT, etc. are used for the panel display 150.

The waveform import section 107 includes an A/D converter for converting (sampling) an analog musical sound signal (external waveform input, e.g., input from a microphone) to digital data. The digital waveform data is imported to the RAM 103 or the hard disk 109 as original waveform data (waveform data as a material for waveform data to be generated). The CPU 101 performs processing of "waveform database creation" to create a "waveform database" according to the present invention based on the imported original waveform data. Further, the CPU 101 performs processing of "musical sound synthesis based on the database" to create waveform data for any musical sound signal corresponding to musical performance information by using the "waveform database". Of course, it is possible to simultaneously generate a plurality of musical sound signals. Waveform data for the generated musical sound signal is supplied to the waveform output section 108 via the bus line BL and is buffered appropriately. The waveform output section 108 outputs the buffered waveform data according to a specified output sampling frequency, digital-analog converts that data, and sends it to a sound system 108A. Finally, the sound system 108A sounds the musical sound signal output from the waveform output section 108. The hard disk 109 stores a plurality of types of data associated with a musical performance such as waveform data, data for synthesizing waveforms corresponding to the musical performance (data for a performance style table, a code book, etc. to be described later), timbre data comprising various timbre parameters, etc. The hard disk 109 also stores data for controlling various programs etc. executed by the CPU 101.

The drive 106 drives a removable disk (external storage medium 106A) for storing a plurality of types of data associated with a musical performance such as waveform data, data for synthesizing waveforms corresponding to the musical performance (various data for a performance style table, a code book, etc. to be described later), timbre data comprising diverse timbre parameters, etc., and data for controlling various programs etc. executed by the CPU 101. The media 106A driven by the drive 106 can be not only a floppy disk (FD), but also a compact disk (CD-ROM or CD-RAM), a magnet optical disk (MO), a DVD (Digital Versatile Disk), and other types of removable media. When the external storage medium 106A storing a control program is mounted on the drive 106, it may be preferable to directly load its content (control program) into the RAM 103 without copying it to the hard disk 109. It is convenient to provide the control program by using the external storage medium 106A or via the network because control programs can be easily added or upgraded.

The communication interface 111 is connected to a communication network (not shown) such as a LAN, the Internet, a telephone line, etc. The communication interface is connected to a server computer (not shown) etc. via the communication network for importing the control program, various data, or musical performance information from the server computer, etc. to the waveform generator. When the ROM 102 or the hard disk 109 stores no control program or data, the communication interface 111 is used for downloading the control program or various data from the server computer. The waveform generator, working as a client, sends a command to the server computer for downloading the control program or various data via the communication interface 111. When receiving this command, the server computer stores the requested control program or data in the hard disk 109 via the communication interface to complete the download. Further, it may be preferable to include a MIDI interface for receiving MIDI's musical performance information. Obviously, a musical performance keyboard or a performance operation device may be connected to the bus line BL for realtime supplying musical performance information. Furthermore, it may be preferable to supply musical performance information by using the external storage medium 106A which stores desired song's musical performance information.

2. Waveform Database Creation Process
2.1 Outline of the Process

Figure 2:
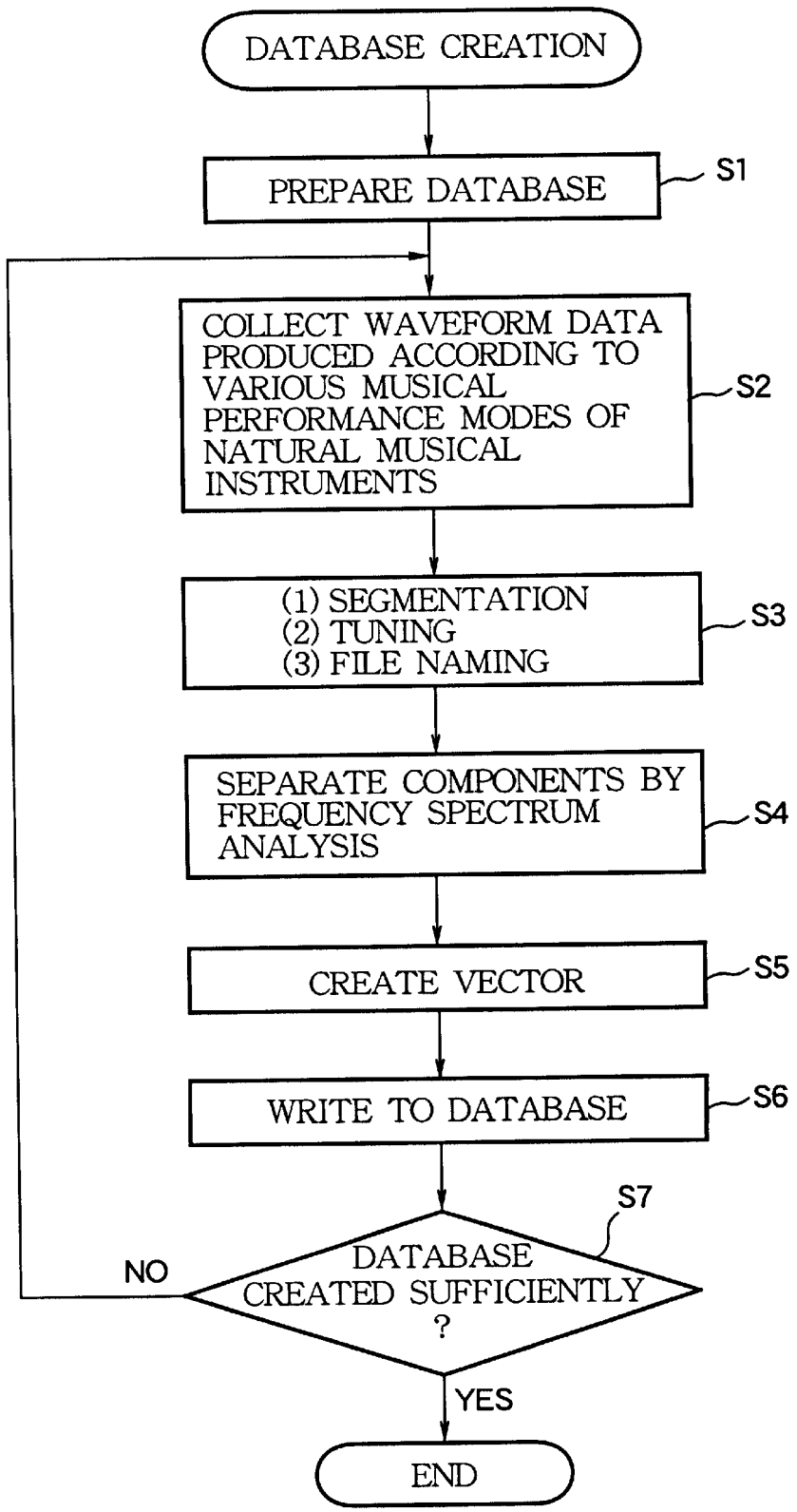
FIG. 2 is a flowchart showing an embodiment of the "waveform database creation process" performed in the waveform generator.

FIG. 2 is a flowchart showing an embodiment of the "waveform database creation process" performed in the aforementioned waveform generator. This process creates vector data based on waveforms of sounds played with various performance styles (or articulations) in order to comply with various performance styles (or articulations).

At step S1, the process prepares a database for storing the performance style table and the code book (to be described). For example, the hard disk 109 is used as a medium for the database. The process collects waveform data according to various performance modes of natural musical instruments (step S2). Namely, actual performance sounds of various natural musical instruments are captured from an external waveform input (e.g., a microphone) via the waveform import section 107. The process stores waveform data (original waveform data) for these performance sounds in a specified area on the hard disk 109. The waveform data for performance sounds to be imported may include all of the musical performance or characteristic part thereof such as a given phrase, one note, an attack portion, or a release portion.

The waveform data is thus obtained from performance sounds according to various performance modes characteristic of natural musical instruments. The process then segments this waveform data into specific portions, tunes and filenames it (step S3). Namely, the process separates the imported original waveform data into partial waveforms (e.g., attack portion waveform, body portion waveform, release portion waveform, joint portion waveform, etc.) representative of changes in the waveform shape ([1] segmentation). The process determines a pitch for each separated waveform data at one or more cycles ([2] tuning). The process further assigns a filename to each separated waveform data ([3] filenaming). This waveform separation ([1] segmentation) can be omitted when the process imports part of the performance waveform data such as the attack portion or the release portion.

The process then separates components by means of the frequency analysis (step S4). Namely, the process separates partial waveform data separately generated at step S3 into a plurality of components by means of the FFT (fast Fourier transform) analysis. In this embodiment, the waveform data is separated into harmonic components and non-harmonic components. The process further extracts characteristics for respective elements such as the waveform, the pitch, and the amplitude from each component (harmonic component, non-harmonic component, and the like). Namely, this means the characteristics separation. (When the waveform data is separated into harmonic components and non-harmonic components, the pitch separation is unneeded for a non-harmonic component because it has no pitch.) For example, the "waveform" (timbre) element is an extracted characteristic comprising only the waveform shape with the normalized pitch and amplitude. The "pitch" element comprises an extracted pitch variation characteristic against a reference pitch. The "amplitude" element comprises an extracted amplitude envelope characteristic.

At step S5, vector data is created. Namely, the process discretely or, as needed, continuously extracts a plurality of sample values from respective elements such as the waveform (timbre), pitch, and amplitude in separated harmonic components, non-harmonic components, etc. A relevant sample value sequence is assigned with a unique vector ID (identification information) and is stored in the code book along with time position data for the sample value. Such sample data is hereafter referred to as vector data. This embodiment creates vector data for the waveform (timbre) element, the pitch element, and the amplitude element in a harmonic component, and vector data for the waveform (timbre) element and the amplitude element in a non-harmonic component. The vector data for each component element can change with the progress along the timing axis. The process then creates data for a performance style module (to be detailed later) and stores the performance style module in the performance style table. The performance style module and the vector data thus created are written to the performance style table and the code book in the database (step S6) for data storage in the database. As mentioned above, the vector data is not original waveform data in itself, but separate data for elements in a waveform representative of the shape of an imported original waveform. This vector data finally becomes unit data for a performance style module. The code book stores compressed partial waveform data representative of changes in the extracted waveform shape. The performance style table stores data for performance style modules (to be detailed later). Namely, this data includes various data needed for restoring the vector data stored in a compressed form to the original waveform data having the waveform shape, ID data for specifying vector data stored in the code book, etc.

During the aforementioned characteristic separation (see step S4), the process performs the characteristic extraction by using the time as an element in addition to the amplitude, pitch, and waveform elements. Vector data for the extracted time element is hereafter referred to as "time vector data". This time element uses the time length as is for original waveform data in a time period for the separately generated partial waveform data. Accordingly, if ratio "1" is used to indicate the original time length (variable) for the time period, the "waveform database creation process" need not analyze or measure this time length. In this case, the code book need not necessarily store data for the time element (i.e., time vector data) because it always takes the same value "1" at any time period. Of course, the present invention is not limited thereto. It is possible to embody an example which analyzes and measures the actual time length, and stores it as "time vector data" in the code book.

Then, it is determined whether or not the database is created fully (step S7). Namely, the process determines whether to fully obtain data for various performance style modules and vector data by sufficiently collecting original waveform data for performance sounds in various performance modes for natural musical instruments obtained from the external waveform input. This determination is not always automatic. It may be preferable to follow instructions whether or not it is possible to continue processing based on user's switch operations. The process terminates when it is determined that the original waveform data is collected and vector data based on it is fully created (YES at step S7). To continue collecting original waveform data and creating vector data based on it (NO step S7), the process returns to step S2 and repeats steps S2 through S7. It may be preferable to generate a musical sound by actually using the created vector data for determining whether or not vector data is fully created (step S7). Namely, control once exits from the flow in FIG. 2 by determining that vector data is fully created (YES at step S7). Thereafter, there may be a case where the musical sound is reproduced by using the created vector data, but is unsatisfactory. In this case, it may be preferable to add vector data by performing the process at and after step S2. That is, vector data is created and added to the database whenever necessary.

In the aforementioned "waveform database creation process", it may be preferable to provide capabilities of adding or deleting any performance style module, or editing data etc. for performance style modules.

2.2 Performance Style Module Data Structure

The following specifically describes performance style module data.

Performance style modules are stored in the performance style table configured to be a database on the hard disk 102. One performance style module can be specified with the combination of a performance style ID and performance parameters. The performance style ID contains musical instrument information and a module parts name. For example, the performance style ID is defined as follows. When one performance style ID is expressed with a sequence of 32 bits (bits 0 to 31), six bits thereof are used to express the musical instrument information. When the 6-bit sequence is "000000", for example, the musical instrument information indicates AltoSax. When the sequence is "001000", the musical instrument information indicates Violin. It may be preferable to use three high-order bits of the 6-bit sequence for a major division of musical instrument types and three low-order bits for a minor division thereof, for example. Another six bits in the 32-bit sequence are used to express a module parts name. For example, the module parts name indicates NormalAttack for the 6-bit sequence "000000"; BendAttack for "000001"; GraceNoteAttack for "000010"; NormalShortBody for "001000"; VibBody for "001001"; NormalLongBody for "001010"; NormalRelease for "010000"; NormalJoint for "011000"; or GraceNoteJoint for "011001". Of course, module parts names are not limited to this configuration.

As mentioned above, each performance style module is specified with the combination of the performance style ID and the performance parameter. Namely, the performance style module is specified according to the performance style ID. Its content is set variably according to the performance parameter. The performance parameter characterizes or controls waveform data corresponding to the performance style module. Specified types of performance parameters are available for each performance style module. For example, the AltoSax [NormalAttack] module may be given types of performance parameters such as an absolute pitch or a volume just after the attack, etc. The AltoSax [BendUpAttack] module may be provided with types of performance parameters such as an absolute pitch at the end of BendUpAttack, an initial value for the bend depth at the time of BendUpAttack, a period of time from the beginning to the end of BendUpAttack (note-on timing), a volume just after the attack, temporal expansion and contraction of a default curve during BendUpAttack, etc. Moreover, the AltoSax [NormalShortBody] module may be assigned with an absolute pitch of this module, the stop time and the start time of NormalShortBody, the dynamics at the beginning or end of NormalShortBody, etc. A performance style module does not necessarily include data corresponding to all available values for performance parameter. The performance style module may store data corresponding to some intermittent values for performance parameters. For example, the AltoSax [NormalAttack] module may store data corresponding to partial data, not all values for an absolute pitch or a volume just after the attack.

As mentioned above, a performance style module can be specified with the performance style ID and the performance style module. Consequently, for example, the AltoSax [NormalAttack] module can specify data corresponding to desired performance parameters out of a plurality of data (element data to be described) indicative of a normal attack portion of the alto saxophone. The Violin [BendAttack] module can specify data corresponding to desired performance parameters out of a plurality of data (element data to be described) indicative of a bend attack portion of the violin.

2.3 Performance Style Table Data Structure

The performance style table stores data needed to generate a waveform corresponding to the relevant performance style module with respect to each performance style module. For example, the performance style table stores a vector ID and a typical point value sequence (data for specifying a typical sample point for correction in a plurality of sample sequences) for specifying vector data (waveform element, pitch element (pitch envelope), amplitude element (amplitude envelope), etc.) for each component element. Alternatively, the performance style table stores information such as the start or stop time position of vector data (waveform element, pitch element (pitch envelope), amplitude element (amplitude envelope)) for each component element. Namely, the performance style table stores various data (hereafter also referred to as "element data") needed to reproduce the waveform in a normal shape from the waveform stored in the database as vector data in a compressed form. The following description uses the AltoSax [NormalAttack] module for explaining an example of specific data to be stored in the performance style table corresponding to a performance style module.

Data 1: Sample length of a performance style module.

Data 2: Note-on timing position.

Data 3: Vector ID and a typical point value sequence for the amplitude element in a harmonic component.

Data 4: Vector ID and a typical point value sequence for the pitch element in a harmonic component.

Data 5: Vector ID for the waveform (timbre) element in a harmonic component.

Data 6: Vector ID and a typical point value sequence for the amplitude element in a non-harmonic component.

Data 7: Vector ID for the waveform (timbre) element in a non-harmonic component.

Data 8: Beginning position of a block of the waveform (timbre) element in a harmonic component.

Data 9: End position of a block of the waveform (timbre) element in a harmonic component (beginning position of a loop for the waveform (timbre) element in a harmonic component).

Data 10: Beginning position of a block of the waveform (timbre) element in a non-harmonic component.

Data 11: End position of a block of the waveform (timbre) element in a non-harmonic component (beginning position of a loop for the waveform (timbre) element in a non-harmonic component).

Data 12: End position of a loop for the waveform (timbre) element in a non-harmonic component.

The aforementioned data 1 through 12 will be described with reference to FIG. 3.

Figure 3:
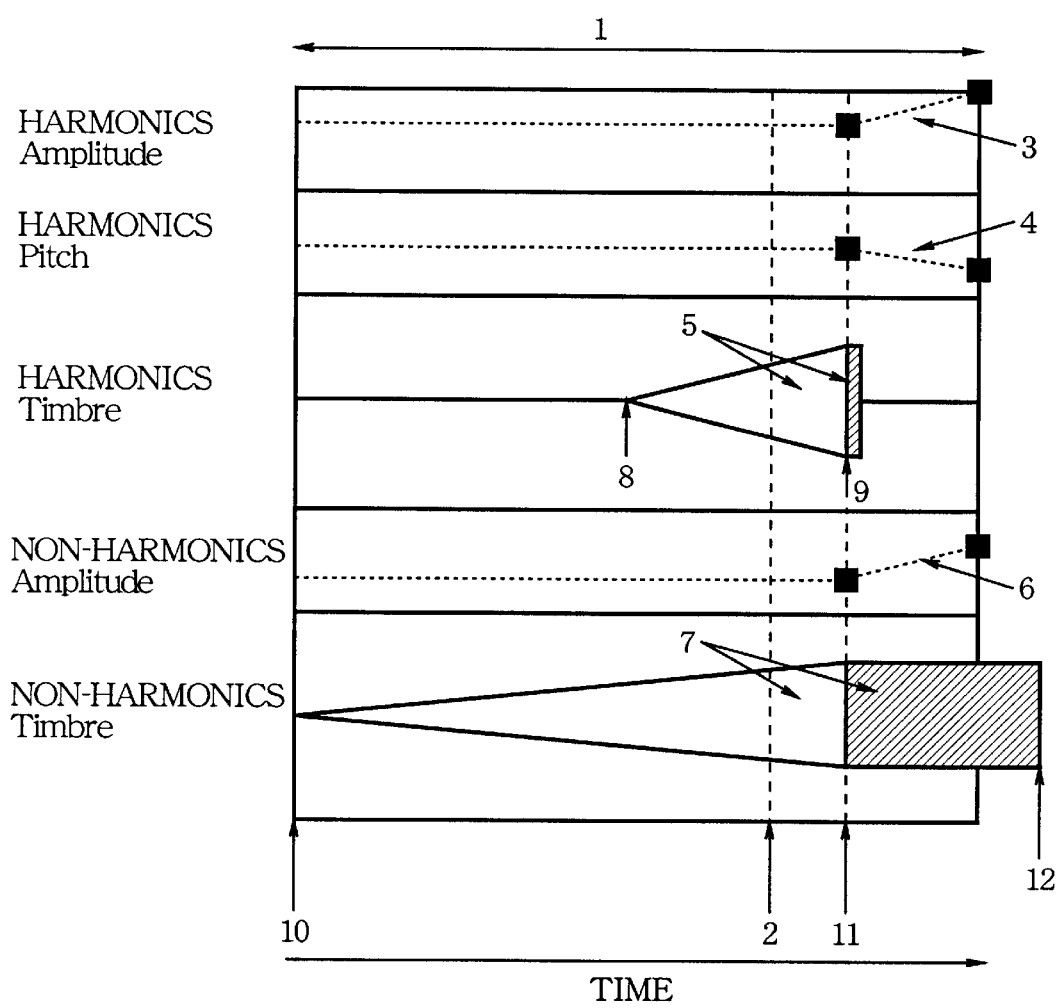
FIG. 3 schematically shows an example of components and elements constituting an actual waveform corresponding to a performance style module.

FIG. 3 schematically exemplifies components and elements constituting an actual waveform section corresponding to the performance style module. From the top to the bottom in this figure, there are shown the amplitude element in a harmonic component, the pitch element in a harmonic component, the waveform (timbre) element in a harmonic component, the amplitude element in a non-harmonic component, and the waveform (timbre) element in a non-harmonic component. Reference numerals in the figure correspond to the aforementioned data numbers.

The reference numeral 1 represents a sample length (waveform duration) of the waveform corresponding to the performance style module. For example, the sample length corresponds to the entire time length for the original waveform data as a basis of the performance style module. The reference numeral 2 denotes a note-on timing position which can be variably specified at any time position in the performance style module. In principle, a performance sound corresponding to the waveform starts sounding from this note-on timing position. Depending on a performance style such as bend attack, for example, the rise time for a waveform component may precede the note-on timing.

The reference numeral 3 denotes a vector ID and a typical point value sequence to indicate vector data for the amplitude element in a harmonic component stored in the code book. In FIG. 3, typical points are represented by two black squares. The reference numeral 4 denotes a vector ID and a typical point value sequence to indicate vector data for the pitch element in a harmonic component. The reference numeral 6 denotes a vector ID and a typical point value sequence to indicate vector data for the amplitude element in a non-harmonic component. The typical point value sequence data is used for changing or controlling vector data (comprising a plurality of sample sequences) specified by the vector ID and indicates or specifies some typical sample points. With respect to a specified typical sample point, its time position (abscissa axis) and level axis (ordinate axis) are changed or corrected. The other sample points change accordingly, thus changing the vector shape. For example, the typical point value sequence data indicates dispersed samples fewer than the samples, but is not limited thereto. The typical point value sequence data may be intermediate data between samples or may be data within a specified range (a plurality of successive samples). Further, the typical point value sequence data may be a difference, a multiplier, etc., not a sample value itself. Each vector data shape can be changed by shifting this typical point along the abscissa axis and/or the ordinate axis (timing axis). Namely, it is possible to change an envelope waveform shape.

The reference numeral 5 denotes a vector ID to indicate vector data for the waveform (timbre) element in a harmonic component. The reference numeral 7 denotes a vector ID to indicate vector data for the waveform (timbre) element in a non-harmonic component. The reference numeral 8 denotes the beginning position of a block of the waveform (timbre) element in a harmonic component. The reference numeral 9 denotes the end position of a block of the waveform (timbre) element in a harmonic component (or the beginning position of a loop for the waveform (timbre) element in a harmonic component). Namely, the triangle starting from the reference numeral 8 indicates a non-loop waveform section which continuously stores a characteristic waveform shape. The succeeding rectangle starting from the reference numeral 9 indicates a loop waveform section which can be read repeatedly. The non-loop waveform is a high-quality waveform having characteristics such as a performance style (or articulation), etc. The loop waveform is a unit waveform corresponding to a relatively monotonous sound portion and comprises a waveform for one cycle or the proper number of cycles. The reference numeral 10 denotes the beginning position of a block of the waveform (timbre) element in a non-harmonic component. The reference numeral 11 denotes the end position of a block of the waveform (timbre) element in a non-harmonic component (or the beginning position of a loop for the waveform (timbre) element in a non-harmonic component). The reference numeral 12 denotes the end position of a loop for the waveform (timbre) element in a non-harmonic component. The aforementioned data 3 through 7 are used as information for indicating vector data stored in the code book for each component element. The aforementioned data 2 and 8 through 12 are used as time information for restoring the original waveform (before separation) from the vector data.

As mentioned above, a performance style module comprises data for indicating the vector data and data for the time information. It is possible to freely compose waveforms by using data for performance style modules stored in the performance style table and using materials (vector data) for waveforms stored in the code book. Namely, the performance style module is data representing the behavior of a waveform which is generated according to the performance style (or articulation). Respective performance style modules may contain different data types or the number of data. In addition to the aforementioned data, the performance style module may be provided with other information etc. such as data for controlling expansion or compression of the waveform's timing axis.

For easy understanding of the explanation, the aforementioned example has shown that one performance style module includes all of the elements (waveform, pitch, amplitude) in a harmonic component and the elements (waveform and amplitude) in a non-harmonic component. However, the present invention is not limited thereto. Obviously, the performance style module may comprise one of the elements (waveform, pitch, amplitude) in a harmonic component or the elements (waveform and amplitude) in a non-harmonic component. For example, the performance style module may comprise one of the waveform (timbre) element in a harmonic component, the pitch element in a harmonic component, the amplitude element in a harmonic component, the waveform (timbre) element in a non-harmonic component, and the amplitude element in a non-harmonic component. This is convenient because performance style modules can be freely combined for each component.

As mentioned above, all of the waveform data does not maintain performance sounds according to diverse performance modes for various natural musical instruments. The waveform database creation process extracts just a partial waveform (e.g., attack portion waveform, body portion waveform, release portion waveform, joint portion waveform, etc.) needed for changes in the waveform shape. Further, a hierarchical compression technique is used according to components, elements, and typical points to store waveform data as compressed data in the hard disk 109. It is possible to save the storage capacity of the hard disk 109 needed for storing the waveform data.

3. Waveform Synthesis Process

Figure 4:
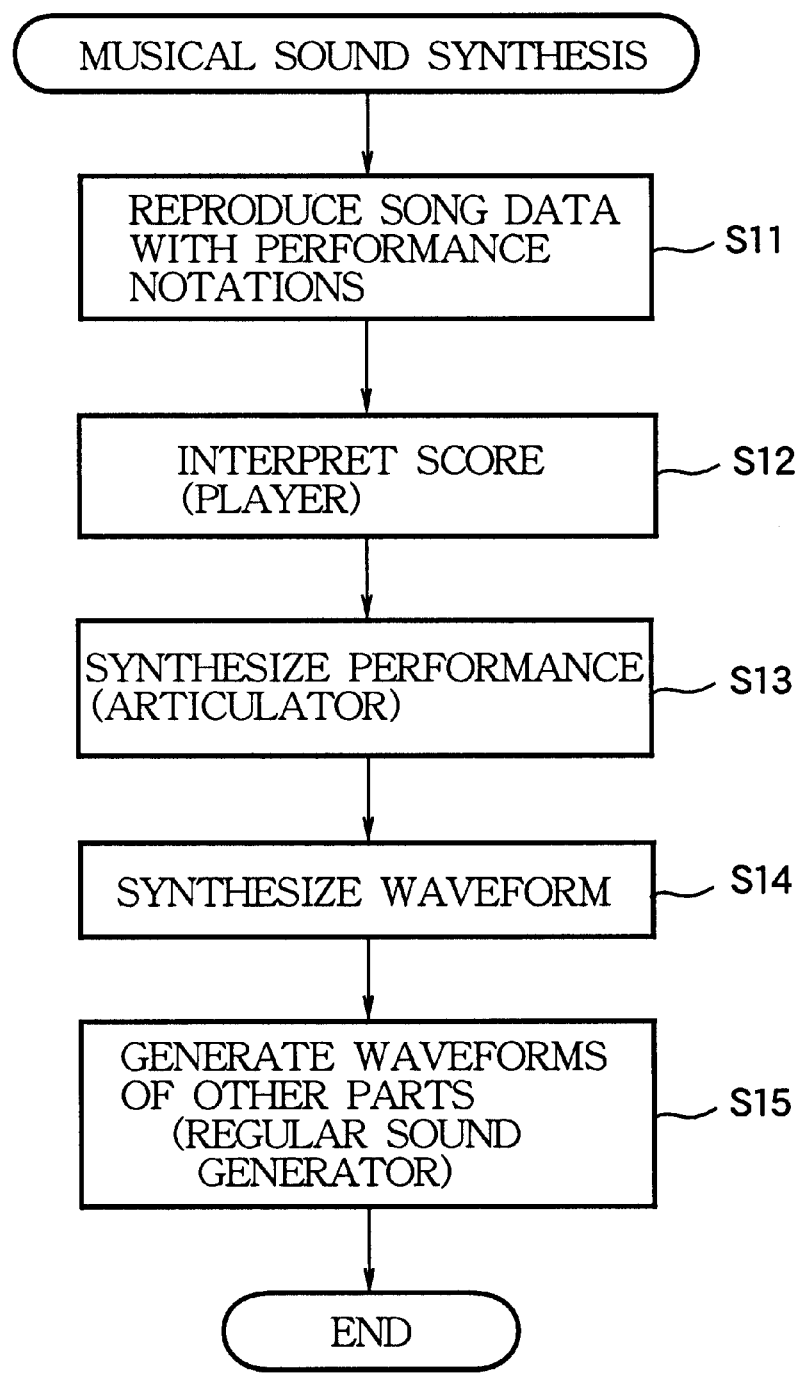
FIG. 4 is a flowchart showing an embodiment of a "musical sound synthesis process based on the database"

The waveform generator in FIG. 1 synthesizes waveforms by allowing the computer to execute a specified program (software) for implementing the waveform synthesis process according to the present invention. FIG. 4 shows an embodiment of the flowchart for the program ("musical sound synthesis process based on the database") which implements the aforementioned waveform synthesis process.

Figure 5:
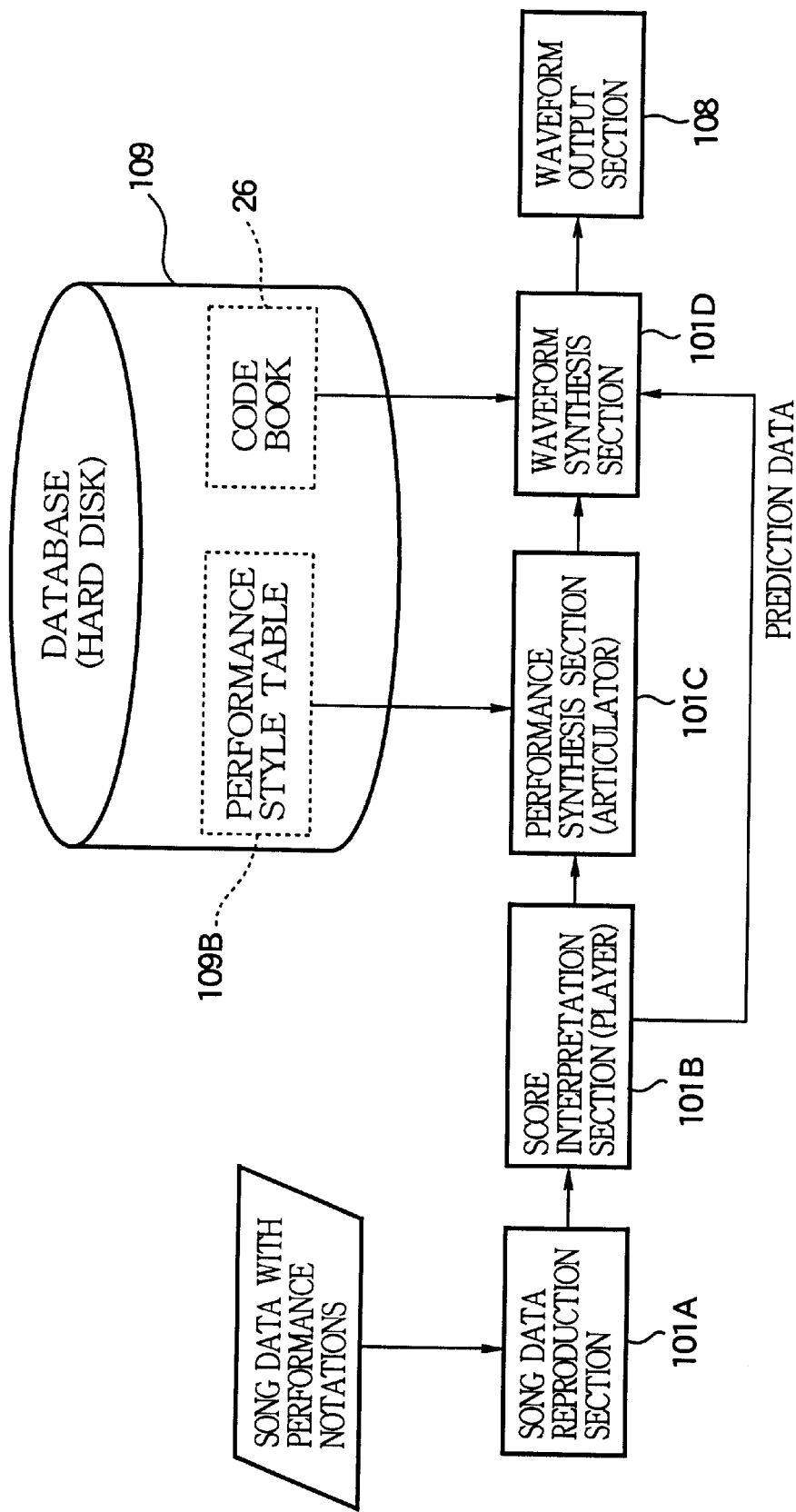
FIG. 5 is a block diagram showing an embodiment of configuring the same waveform synthesis process as that in FIG. 4 in the form of dedicated hardware.

In this embodiment, however, various functions implemented by the program are independent of each other. The following describes operations based on the functional block diagram in FIG. 5. The present invention is not limited to this type of program. The waveform synthesis process may be embodied on a dedicated hardware apparatus. In this case, FIG. 5 is a block diagram of the dedicated hardware apparatus configured to provide the same waveform synthesis process as shown in FIG. 4. The following description mainly follows FIG. 5 and indicates corresponding steps in FIG. 4 in parentheses.

3.1 Song Data Reproduction Section 101A

The song data reproduction section 101A reproduces song data with performance notations (step S11). First, the song data reproduction section receives song data with performance notations (musical performance information). An ordinary musical score contains musical marks such as dynamic marks (crescendo, decrescendo, etc.), tempo marks (allegro, ritardando, etc.), slurs, tenutos, accents, etc. These marks, if unchanged, cannot be MIDI data. To solve this, these marks are transformed to data as "performance notations". MIDI song data containing performance notations is referred to as "song data with performance notations". The performance notation comprises a chart ID and chart parameters. The chart ID indicates a musical mark on the score. The chart parameter indicates the degree of contents of the musical mark indicated by the chart ID. When the chart ID indicates "vibrato", for example, chart parameters are provided to specify a speed, depth, etc. of the vibrato. When the chart ID indicates "crescendo", chart parameters are provided to specify a volume at the beginning or end of the crescendo, a time length for volume changes, etc.

3.2 Score Interpretation Section 101B

The score interpretation section (player) 101B performs a score interpretation process (step S12). Specifically, this section converts MIDI data and the aforementioned "performance notation" (chart ID and chart parameters) contained in the song data to the performance style specification information (performance style ID and performance parameters). The converted data is output to a performance synthesis section (articulator) 101C together with the time information. Generally, the same musical mark may be differently interpreted by performers. They may adopt different performance styles or articulations for performance. Further, performers may play a series of notes according to different performance styles. The score interpretation section is an expert system of the knowledge for interpreting marks on a score (musical marks, arrangement of musical notes, etc.)

For example, the score interpretation section uses the following criteria for interpreting marks on a score. The vibrato is just applicable to an eighth note or longer. The staccato naturally increases dynamics. A degree of tenuto determines a note's decrement. The legato does not attenuate within a note. The time value determines a speed of vibrato for an eighth note. The dynamics depends on a pitch. Moreover, there are various interpretation criteria such as changes in the dynamics due to increase or decrease of a pitch within a phrase, dB-linear gain for attenuated dynamics, changes in the note length corresponding to a tenuto or a staccato, and a bend-up width and curve corresponding to the bend-up mark in the attack portion. Based on these criteria, the score interpretation section 101B interprets the score to convert it to musical performance data. Further, the score interpretation section 101B performs the aforementioned score interpretation process according to the user's player specification, i.e., the specification of the player for the performance (performance style). The score interpretation section 101B interprets the score according to this player specification by varying the interpretation method. For example, the database stores different score interpretation methods compliant with a plurality of players. The score interpretation section 101B interprets the score by selectively varying the score interpretation methods according to the user's player specification.

It may be preferable to configure song data (musical performance information) so as to previously include data indicative of score interpretation results. Obviously, the aforementioned process is unnecessary when the input song data contains data for the result of previously interpreting the score. The interpretation of a score by the score interpretation section 101B (step S12) may be fully automatic or semiautomatic by appropriately permitting user's input operations.

Figure 21:
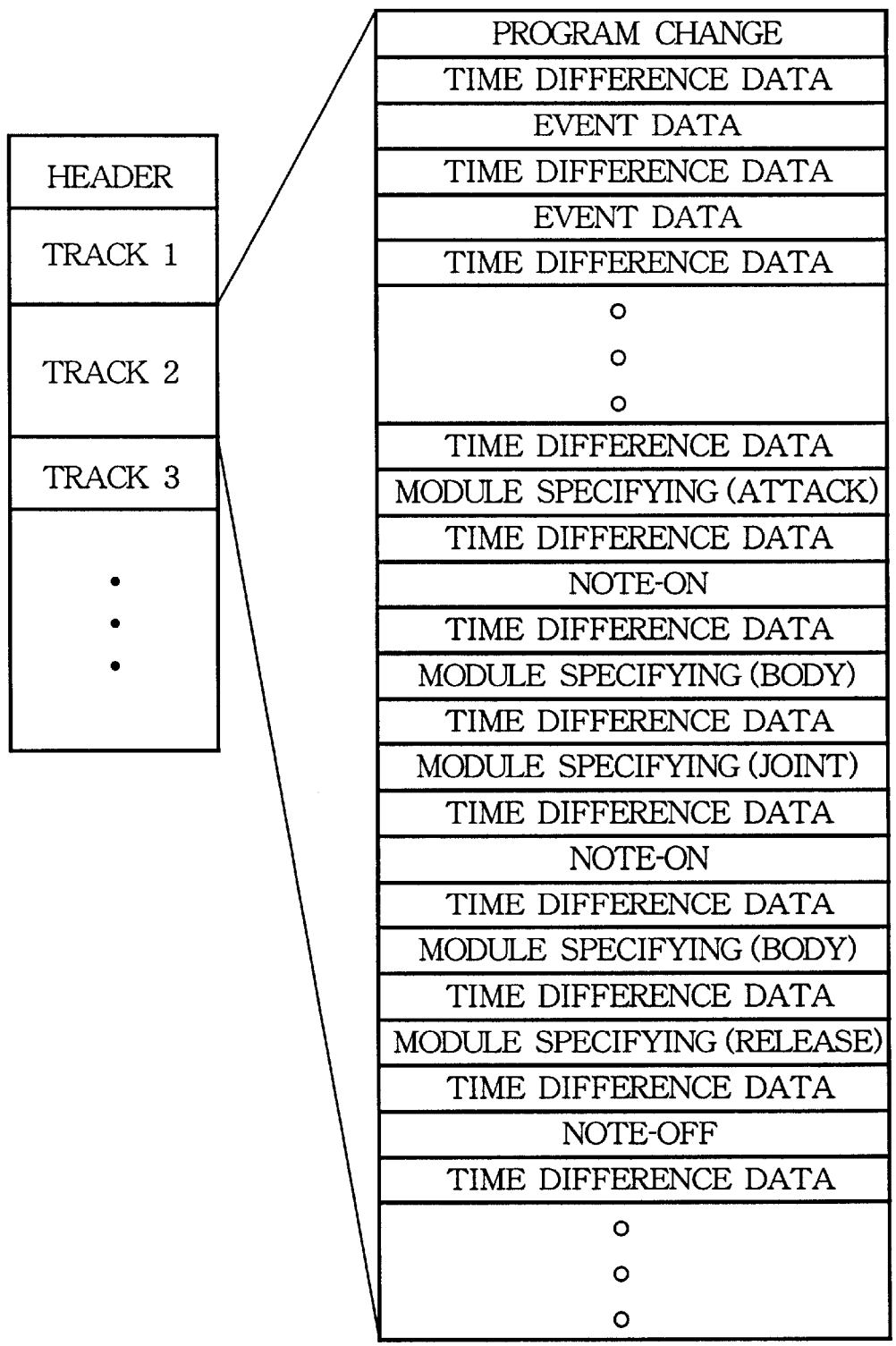
FIG. 21 shows the content of musical performance data created in the score interpretation section 101B.

Referring now to FIG. 21, the following describes contents of musical performance data created in the score interpretation section 101B.

Like the normal SMF (standard MIDI format), musical performance data comprises a header and a plurality of tracks. Each track contains a program and event data (note-on, note-off, etc.). In this embodiment, each track contains a module specification portion for specifying modules of the attack portion, the body portion, the joint portion, and the release portion. The module specification portion is the performance style specification information containing a performance style ID and a performance parameter. Actually, these module specification portions use undefined system exclusive messages, meta-events, 14-bit control changes, etc. Further, each track contains time difference data for specifying a time difference between event data or module specification portions.

There may be a case where each track contains a program change for specifying timbres, i.e., a new database (the performance style table and the code book). In this case, the score interpretation section 101B supplies a waveform synthesis section 101D with the program change as prediction data. Since the waveform synthesis section 101D reads vector data to be used next by predicting it from the code book, the program change is specified in order to limit a prediction range to some extent (to be detailed later). The prediction data also contains other various data. Based on song data, the score interpretation section 101B supplies the waveform synthesis section 101D with "data indicating the subsequent performance style specification" as prediction data. The aforementioned program change is included as one of prediction data.

3.3 Performance Synthesis Section 101C

The performance synthesis section (articulator) 101C references the performance style table based on the performance style specification (performance style ID and performance parameter) converted by the score interpretation section (player) 101B. This section generates a packet stream (also referred to as a vector stream) corresponding to the performance style specification (performance style ID an performance parameter) and a vector parameter concerning that stream corresponding to the performance parameter, and supplies them to the waveform synthesis section 101D (step S13). The waveform synthesis section 101D is supplied with data as a packet stream containing packet time information, a vector ID, a typical point value sequence, and the like with respect to the pitch element and the amplitude element. With respect to the waveform (timbre) element, that data contains a vector ID, time information, and the like (to be detailed layer).

The waveform synthesis section 101D retrieves vector data from the code book according to the packet stream, modifies that vector data according to vector parameters, and synthesizes a waveform based on the modified vector data (step S14). The waveform synthesis section 101D then performs a waveform generation process for the other parts (step S15). Of a plurality of performance parts, the other parts are those performance parts for which no performance synthesis process is performed and the normal musical sound waveform synthesis process is applied. For example, the normal waveform memory sound source system is used to generate musical sounds for these other parts. This "waveform generation process for the other parts" may be performed on a dedicated hardware sound source (an external sound unit or a sound card mountable on a computer). For ease of explanation, this embodiment uses only one part to generate musical sounds corresponding to the performance style (or articulation). Of course, a plurality of parts may be used to reproduce the performance style.

Figure 6:
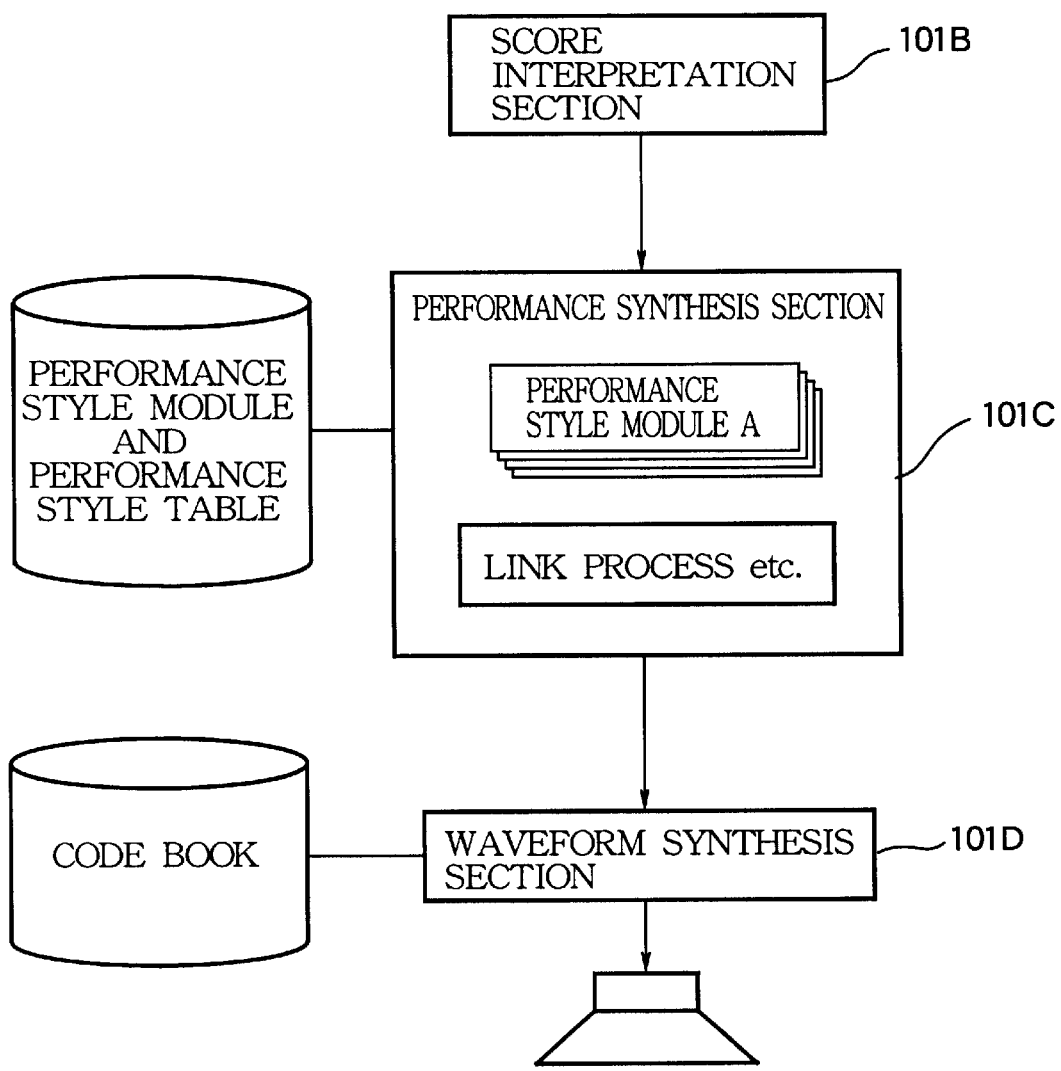
FIG. 6 is a block diagram for illustrating a flow of the performance synthesis process in the aforementioned performance synthesis section.

FIG. 6 is a block diagram for illustrating a flow of the performance synthesis process in the aforementioned performance synthesis section 101C. Although FIG. 6 is presented as if the performance style module and the code book were stored separately, both are actually stored in the database on the hard disk 109.

The performance synthesis section 101C creates various packet streams to be supplied to the waveform synthesis section 101D based on the performance style specification (performance style ID and performance parameter) and data of the time information from the score interpretation section 101B. The performance synthesis section 101C does not use a performance style module permanently for each timbre. A user can add a new performance style module to currently used performance style modules or stop using some of them. The performance synthesis section 101C also performs a process of creating the correction information for correcting a difference between the selected element data and the performance parameter value, and a process of smoothing a junction for smoothly connecting waveform characteristics of preceding and subsequent performance style modules.

Normally, the score interpretation section 101B supplies data to the performance synthesis section 101C, but the present invention is not limited thereto. As mentioned above, it may be preferable to prepare song data with performance style wherein that song data is already interpreted by the score interpretation section 101B. Alternatively, it may be preferable to prepare song data with performance style wherein a user provides that song data with the performance style ID and performance parameters by interpreting the score. The performance synthesis section 101C may be supplied with data by reproducing that song data.

Figure 7:
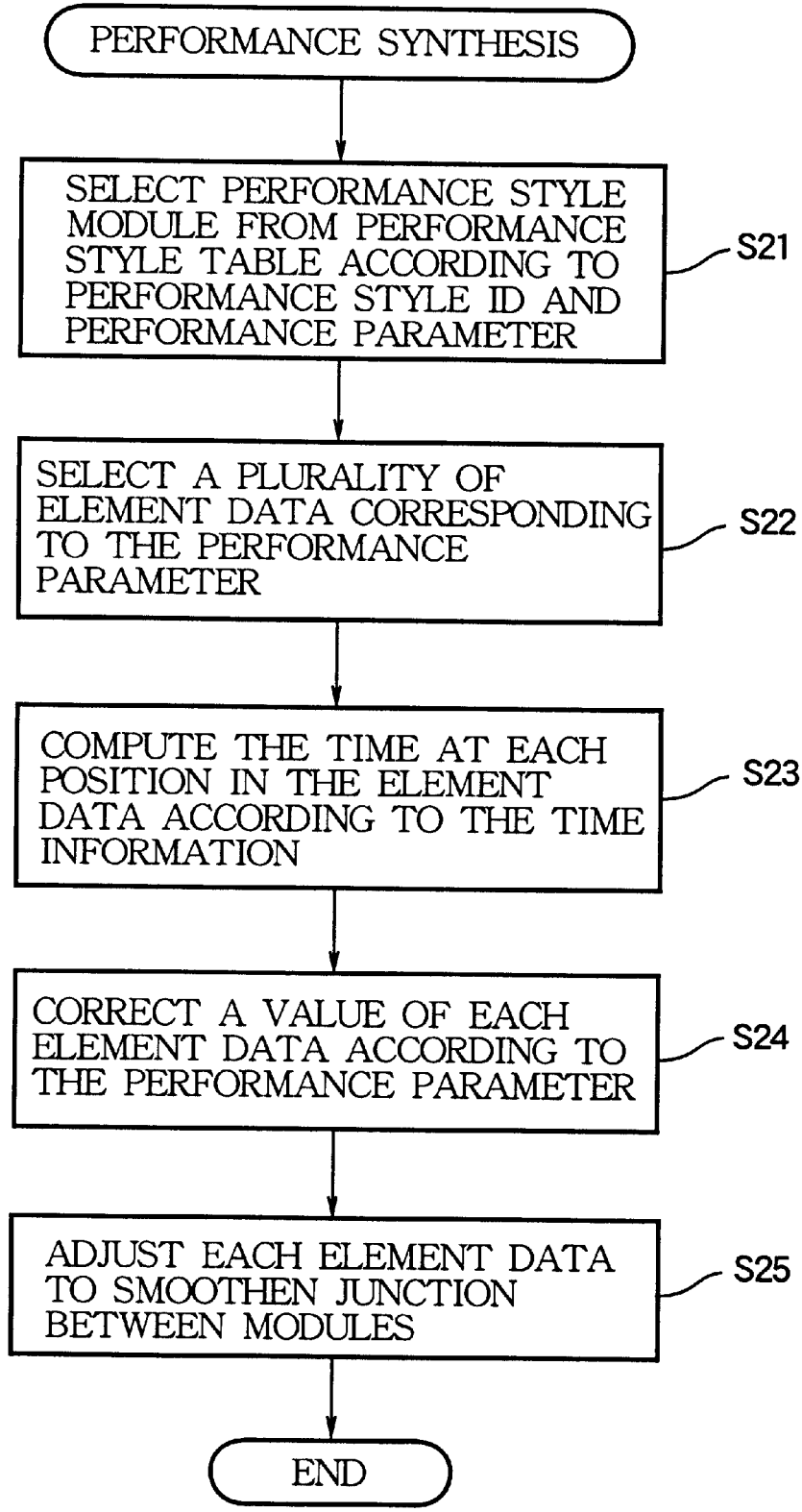
FIG. 7 is a flowchart showing in detail an embodiment of the performance synthesis process performed in the performance synthesis section.

FIG. 7 is a flowchart showing in detail an embodiment of the performance synthesis process.

The performance synthesis section 101C selects a performance style module from the performance style table according to the performance style ID and the performance parameter (step S21). Namely, the performance synthesis section 101C selects one performance style module according to the performance style ID (musical instrument information and module parts name) and the performance parameter sent from the score interpretation section 101B. Before interpreting the score, the score interpretation section 101B checks the database to determine what module parts exist in the performance style table corresponding to the timbre indicated by the musical instrument information. The score interpretation section 101B specifies a performance style ID within the range of existing parts. When a non-existing part is specified, it may be preferable to instead select a performance style ID having similar characteristics. Then, the performance synthesis section 101C selects a plurality of element data corresponding to the specified performance style ID and performance parameter (step S22). Namely, the performance synthesis section 101C specifies a performance style module by referencing the performance style table according to the specified performance style ID and performance parameter and selects a plurality of element data corresponding to the performance parameter from that module. When the performance style module does not contain element data completely matching the performance parameter, the performance synthesis section 101C selects element data corresponding to a value approximate to the performance parameter.

The process then computes the time at each position in the element data according to the time information (step S23). Namely, each element data is arranged at the absolute time position based on the time information. Specifically, the process computes the absolute time based on the time information from the element data indicating each relative time position. Thus, the process determines the timing of each element data (see FIG. 3). Further, the process corrects a value of each element data according to the performance parameter (step S24). Namely, the process corrects a deviation between the selected element data and the performance parameter. For example, the score interpretation section 101B sends the AltoSax [NormalAttack] module whose volume (performance parameter) just after the attack is set to "95". When the performance style table contains the AltoSax [NormalAttack] module whose volume just after the attack is set to "100", the performance synthesis section 101C selects element data for the AltoSax [NormalAttack] module whose volume just after the attack is set to "100". However, the volume just after the attack remains to be "100". The volume just after the attack is corrected to "95" by correcting a typical point for the selected element data. The correction is performed so that the value of the selected element data approximates to the performance parameter value. In addition, there are performed correction according to the predetermined value for micro-tuning (musical instrument tuning), volume correction according to volume change characteristics of a musical instrument, etc. These corrections are performed by changing typical point values or respective element data. Typical point values may change greatly. Namely, a typical point is data necessary and sufficient for the correction. Various corrections are performed by controlling this typical point.

The aforementioned step S23 may correct a time position indicated by the time information by using correction information such as the performance parameter. For example, there may be a difference between the time position obtained on the basis of the musical performance data and the time position indicated by the aforementioned time information. In such a case, the process selects time information indicating a time position approximate to the time position obtained on the basis of the musical performance data. The process corrects the obtained time position information according to the musical performance data. This makes it possible to obtain the intended time position information for the musical performance data. Alternatively, the musical performance data may contain a variable control factor such as a touch or a velocity. In this case, it is possible to provide variable control of the time position information according to the musical performance data by correcting the time position information according to that variable control factor. The correction information includes information for this time position correction.

Further, each element data is adjusted to perform a link process for smoothing the junction between adjacent performance style modules (step S25). Namely, the process smoothes waveform characteristics of preceding and subsequent performance style modules by closely connecting typical points to each other in junctions for the preceding and subsequent performance style modules. This connection or link process is performed individually for respective elements of the waveform (timbre), the amplitude, and the pitch in a harmonic component or respective elements of the waveform (timbre) and the amplitude in a non-harmonic component.

At this time, the adjustment is performed from the "beginning of the link" in the preceding performance style module to the "end of the link" in the subsequent performance style module. Namely, the process adjusts typical points within the range from the "beginning of the link" to the "end of the link" based on an "approximation rate". This "approximation rate" is a parameter for controlling an amount of approximation from each of the preceding and subsequent performance style modules to make a connection therebetween. As will be described later, the approximation rate depends on a combination of the preceding and subsequent performance style modules. When the preceding and subsequent performance style modules are connected, waveforms may not be connected successfully. In this case, the connection is smoothed by thinning a vector ID for the waveform characteristic from either of the preceding and subsequent performance style modules. In order to implement this skip, there are provided a "performance style module combination table", a "skip execution parameter range table" to be referenced, and a "skip time table" to be referenced.

In addition, waveform characteristics can be connected smoothly by means of the following link process in the score interpretation section 101B. For example, the process smoothly connects discontinuous portions in performance parameters (dynamics value, pitch parameter value, etc.) independently of performance style modules. Alternatively, in the case of shift from a vibrato to a release, a smooth connection is made by early diminishing the vibrato.

Figure 8:
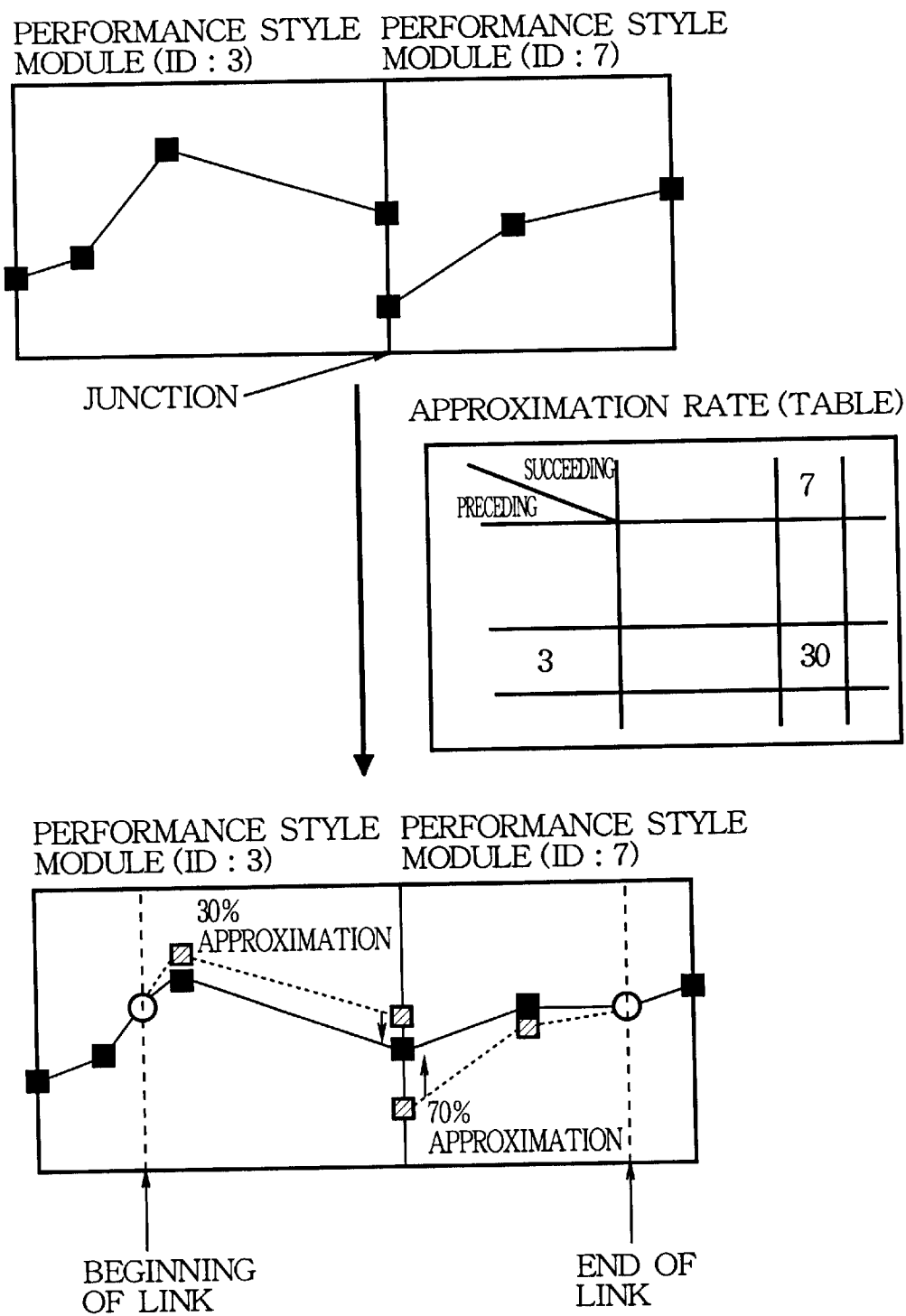
FIG. 8 is schematic diagram for explaining a link process when a performance style module corresponds to the amplitude element or the pitch element.

The aforementioned link process will be discussed in detail below. Namely, the following concisely describes adjustment of each element data for smoothing a junction (see step S25) between the preceding and subsequent performance style modules. Referring to FIG. 8, the link process is described with respect to a case where the performance style module corresponds to the amplitude element or the pitch element.

There is a case where an aberration occurs at a junction between the preceding and subsequent performance style modules due to discontinuous typical point values in the junction therebetween. In this case, the "approximation rate" needs to be settled first as an index for determining to which of values for the preceding and subsequent performance style modules the target value for a connection point should approximate. At this time, a dynamics connection point is used for the amplitude or a pitch connection point is used for the pitch. In this embodiment, it is assumed that approximation rates are given in a table as shown in FIG. 8. For example, when the vector ID for the preceding performance style module is "3" and the vector ID for the subsequent performance style module is "7", the "approximation rate" is found to be "30" from the table. Based on the selected "approximation rate", the envelope shape is gradually transformed toward the target value from the "beginning of the link" for the preceding performance style module to the "end of the performance style module". Moreover, the envelope shape is gradually transformed toward the target value from the "end of the link" for the subsequent performance style module to the "beginning of the performance style module". When the "approximation rate" is set to "30", for example, the target value for the preceding performance style module is "30". The preceding performance style module approximates to the subsequent performance style module "30%". (In this embodiment, the last typical point in the preceding performance style module approximates downward "30%".)

By contrast, the preceding performance style module approximates to the subsequent performance style module "70%" (100%–30%). (In this embodiment, the first typical point in the subsequent performance style module approximates upward "70%".) A plurality of typical points exits in the preceding and subsequent performance style modules from the beginning to the end of the link and approximates upward and downward together with the aforementioned approximation. As mentioned above, the approximation takes place at a plurality of typical points in the preceding and subsequent performance style modules. The beginning and the end of a link may be appropriately settled. Preferably, the beginning or the end of a link may be set to the same point as an intended typical point so as to eliminate a bend from the envelop shape at the beginning or the end of a link as shown in the figure. Even when the beginning or the end of a link is not set to the same point as an intended typical point, the approximation is obviously permitted so that no bend occurs in the envelope shape.

A method of determining the "approximation rate" is not limited to the aforementioned example. For instance, the approximation rate may be determined based on performance parameters specified before and after the connection point. Alternatively, the approximation rate may be determined based on musical performance data before the performance style ID or the performance parameter is generated. Furthermore, the approximation rate may be determined based on a combination of these data. The aforementioned example uses a single typical point for the approximation based on the "approximation rate". The other typical points approximate for appropriate amounts according to this approximation. It may be also preferable to determine an individual "approximation rate" for each of a plurality of typical points and to approximate a plurality of typical points on the basis of each "approximation rate".

Figure 9:
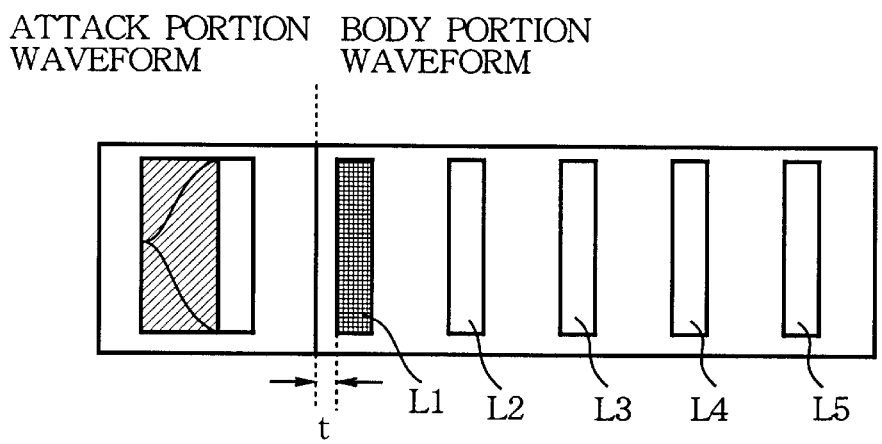
FIG. 9 is a schematic diagram for describing waveform thinning when the attack portion waveform is connected to the body portion waveform.
Figure 10:
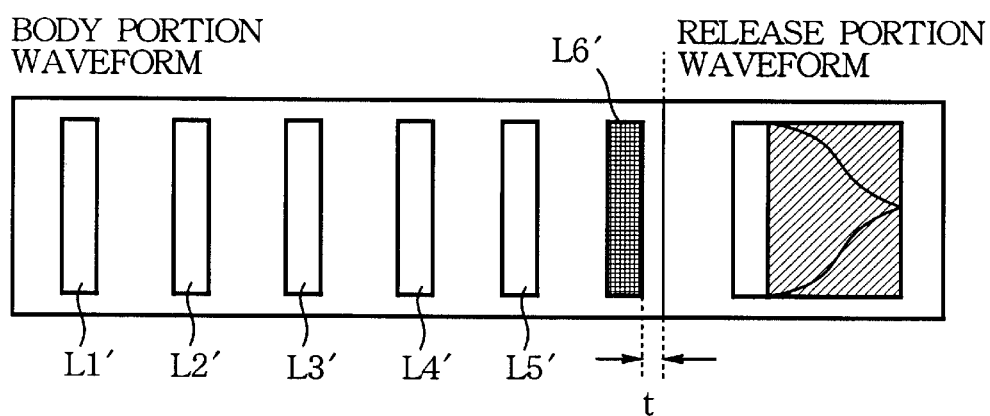
FIG. 10 is a schematic diagram for describing waveform thinning when the body waveform is connected to the release waveform.

Then, the link process is described with respect to a case where a performance style module is the waveform (timbre) element. FIGS. 9 through 12 are schematic diagrams for explaining the link process when a performance style module is the waveform (timbre) element. FIG. 9 is a schematic diagram for describing waveform thinning when the attack portion waveform is connected to the body portion waveform. FIG. 10 is a schematic diagram for describing waveform thinning when the body portion waveform is connected to the release portion waveform. In FIG. 9, the body portion waveform comprises five loop waveforms L1 through L5 each of which is reproduced in a loop within the specified time range. Likewise, the body portion waveform in FIG. 10 comprises six loop waveforms L1' through L6'.

There are various methods of adjusting element data concerning waveforms (i.e., link processes for waveforms). As an example, there is proposed a method of partially thinning a waveform to smooth, e.g., connection between a performance style module for the attack portion or the joint portion and a performance style module for the body portion (or connection between a performance style module for the body portion and the release portion or the joint portion). A cross-fade is widely known for connection between waveforms. However, when time t is short from the time point of the connection to the beginning of loop waveform L1 as shown in FIG. 9, a rapid cross-fade is needed within short time t. Namely, the rapid cross-fade signifies a cross-fade performed during a very short time between waveforms to be connected. Performing such a rapid cross-fade causes a waveform which generates a large noise. This is unfavorable.

To prevent rapid waveform cross-fading, part of the waveform is skipped (deleted) to increase a time interval between waveforms to be connected. In this case, the waveform for the attack portion, the release portion, or the joint portion constitutes a block, preventing waveforms from being skipped. Accordingly, loop waveforms are skipped from the body portion. In FIGS. 9 and 10, loop waveforms L1 and L6' are to be skipped. These loop waveforms are represented in black squares. In FIG. 9, for example, a cross-fade is performed between the second loop waveform L2 with a relatively long time difference from the connection time point and the last waveform in the attack portion waveform. The first loop waveform L1 is not used. Likewise in FIG. 10, a cross-fade is performed between loop waveform L5' and the release portion waveform, not using loop waveform L6'.

It should be noted that the joint portion is a waveform region for connection between sounds (or between sound portions) by using any performance style.

Figure 11:
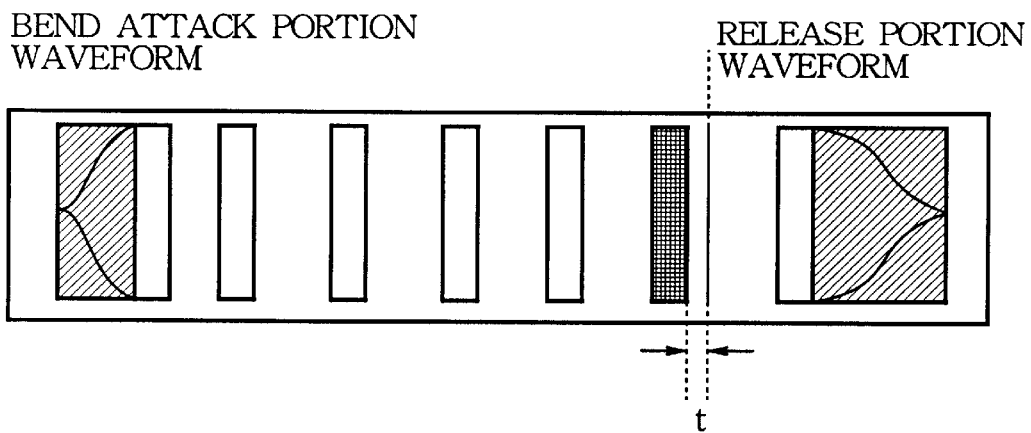
FIG. 11 is a schematic diagram for describing waveform thinning when the bend attack waveform is connected to the release waveform.
Figure 12:
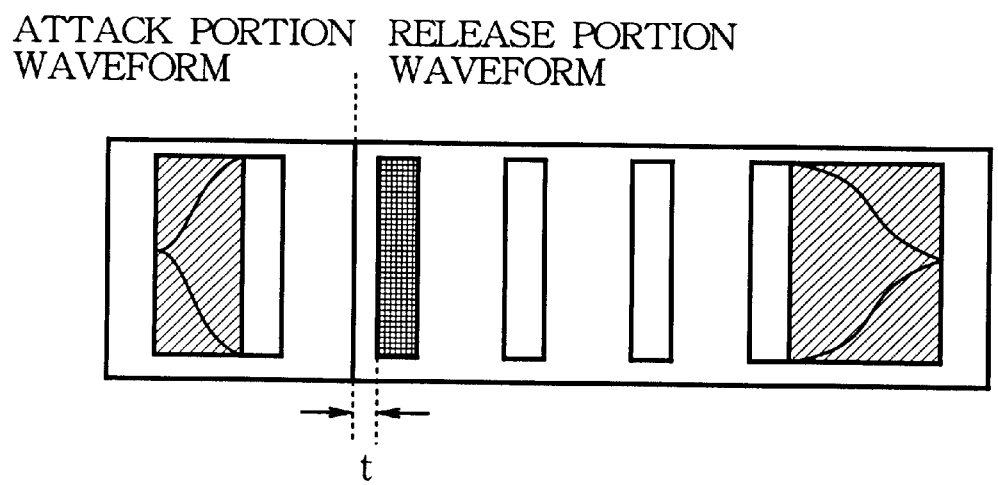
FIG. 12 is a schematic diagram for describing waveform thinning when the normal attack waveform is connected to the release waveform having a loop portion.

A waveform skip is performed to smooth connection between a performance style module for the attack portion and a performance style module for the release portion or the joint portion. FIGS. 11 and 12 are schematic diagrams for explaining a waveform skip when the attack portion waveform is connected to the release portion waveform.

In this case, a waveform may or may not be skipped from a performance style module for the attack portion or the release portion. The bend attack portion is an example of attack portions which allow the waveform skip from the associated performance style modules. The second half of the bend attack portion contains several loop waveforms. The waveform skip is also feasible for the release portion whose first half contains several loop waveforms. A waveform is skipped from a performance style module for the portion capable of the waveform skip. When the bend attack portion is connected to the release portion, for example, a loop waveform is skipped from the bend attack portion side as shown in FIG. 11. (FIG. 11 shows that one loop waveform represented by a black square is skipped from the bend attack portion side.) When the normal attack portion is connected to the release portion having a loop waveform, the loop waveform is skipped from the release portion side as shown in FIG. 12. (FIG. 12 shows that one loop waveform represented by a black square is skipped from the release portion side.)

A loop waveform to be skipped need not necessarily be nearest to a junction between performance style modules. Namely, it need not be the first or last loop waveform. It may be preferable to select a loop waveform to be skipped from a plurality of loop waveforms according to given priorities.

As mentioned above, a waveform is skipped when a connection is unsuccessful within a range of performance style modules in a given combination of performance style modules. To implement this, there are provided, e.g., a "performance style module combination table", a "skip execution parameter range table" to be referenced, and a "skip time table" to be referenced. The "performance style module combination table" determines given parameters according to a combination of preceding and subsequent performance style modules to be connected. The "skip execution parameter range table" determines a time range in order to perform a skip for each of the aforementioned parameters. The "skip time table" determines a skip time. There is a time difference (time t in FIGS. 9 through 12) between the connection time point and the first (or last) loop waveform L1 (or L6'). When this time difference is shorter than the reference skip time, the corresponding loop waveform is skipped.

Figure 13:
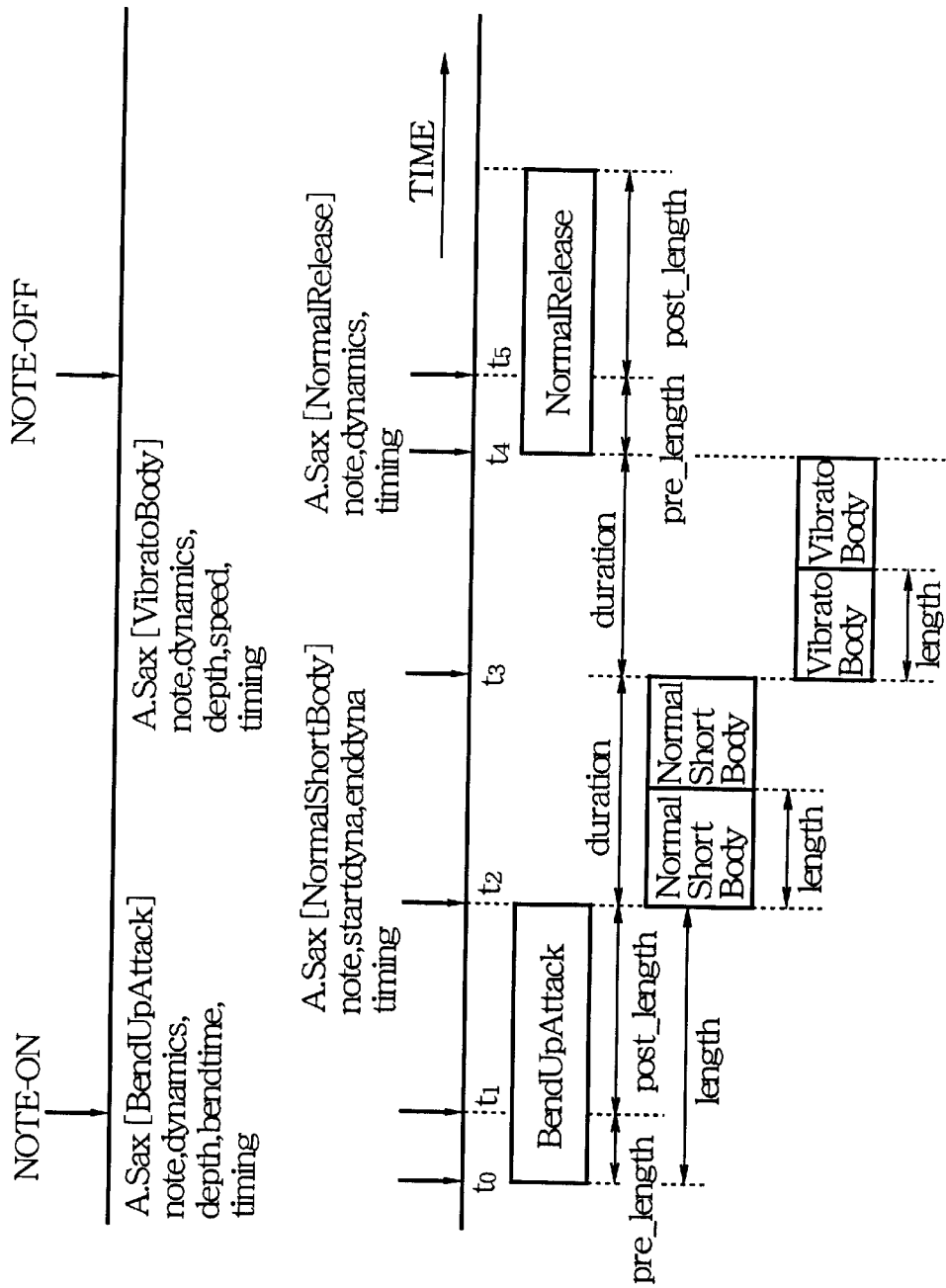
FIG. 13 is a schematic diagram for describing a waveform connection when a performance style module ends before another performance style module subsequent to that performance style module starts.

With reference to FIG. 13, the following describes a waveform connection when a performance style module has the short sample length and ends before another performance style module subsequent to that performance style module starts. In FIG. 13, a packet stream for the waveform (timbre) element comprises four performance style modules, i.e., A.Sax[BendUpAttack], A.Sax[NormalShortBody], A.Sax[VibratoBody], and A.Sax[NormalRelease] arranged from the left to the right in the figure chronologically. Each performance style module's sample length (duration) is expressed in "length". In FIG. 13, "note-on" and "note-off" described on the top are event timings of MIDI data. In the middle of the figure, A.Sax[BendUpAttack] and so on indicate generation timings of respective performance style IDs. Note, dynamics, depth, etc. denote generation timings of respective performance parameters.

The A.Sax[BendUpAttack] module starts from time t0. Time t1 is a note-on timing within that module and should correspond to the specified note-on timing. The content of the packet stream for the module is controlled based on performance parameters such as the aforementioned note, dynamics, depth, etc. The A.Sax[NormalShortBody] module starts from time t2 just after the attack module. Time t3 indicates a timing to start the vibrato performance style from the middle of the junction. This timing is determined based on the start timing for a vibrato mark provided in song data, for example. Time t5 denotes a note-off timing in the A.Sax[NormalRelease] module and should correspond to the specified note-off timing. Time t4 for the beginning of the A.Sax[NormalRelease] is specified accordingly.

Since a note-on event occurs at time t1 and a note-off event occurs at time t5, the actual sounding time according to a waveform generated from the packet stream ranges from time t1 to time t5. In the case of this packet stream, it is often that a time period from time t2 to time t4 does not match the sum of sample lengths for the A.Sax[NormalRelease] module and the A.Sax[VibratoBody] module. An appropriate corrective measure is needed. In this case, the sum of sample lengths is adjusted to the aforementioned time period by repeating the same performance style module, by varying sample lengths for the performance style modules, or by combining the both methods. In this way, the modules are adjusted for waveform connection. In the aforementioned example, the A.Sax[NormalShortBody] module is repeated to make a waveform connection with the subsequent A.Sax [VibratoBody] module. Likewise, the A.Sax[VibratoBody] module is repeated to make a waveform connection with the subsequent A.Sax[NormalRelease] module.

As mentioned above, when a performance style module is repeated for waveform connection, a variable time length should be given to the performance style module to be repeated. This variable control of the time length is provided by moving a typical point in the A.Sax[NormalShortBody] module or the A.Sax[VibratoBody] module. Namely, this control is implemented by an appropriate method such as varying the time for a cross-fade connection between a plurality of loop waveforms constituting the A.Sax [NormalShortBody] module or the A.Sax[VibratoBody] module. A loop waveform relatively easily makes it possible to provide variable control of the time length for the entire loop reproduction waveform by setting the number of loops or the loop continuation time to be variable. In the case of a non-loop waveform, on the other hand, it is not so easy to variably control its length existing on the timing axis. Accordingly, as mentioned above, variable control is provided so as to expand and contract the timing axis for waveform data during a loop read period in a sequence of sound waveforms comprising a non-loop waveform and a loop waveform. An invention for providing variable control over the entire sounding time length is very advantageous to easy control over the temporal expansion and contraction. For this purpose, it is recommended to use the "Time Stretch and Compress" control (TSC control) previously proposed by the applicant in Japanese Patent Unexamined Publication No. Hei. 10-307586. Especially, this "TSC control" is desirably applicable because the timing axis length is varied for a non-loop waveform corresponding to a special performance style.

Figure 14:
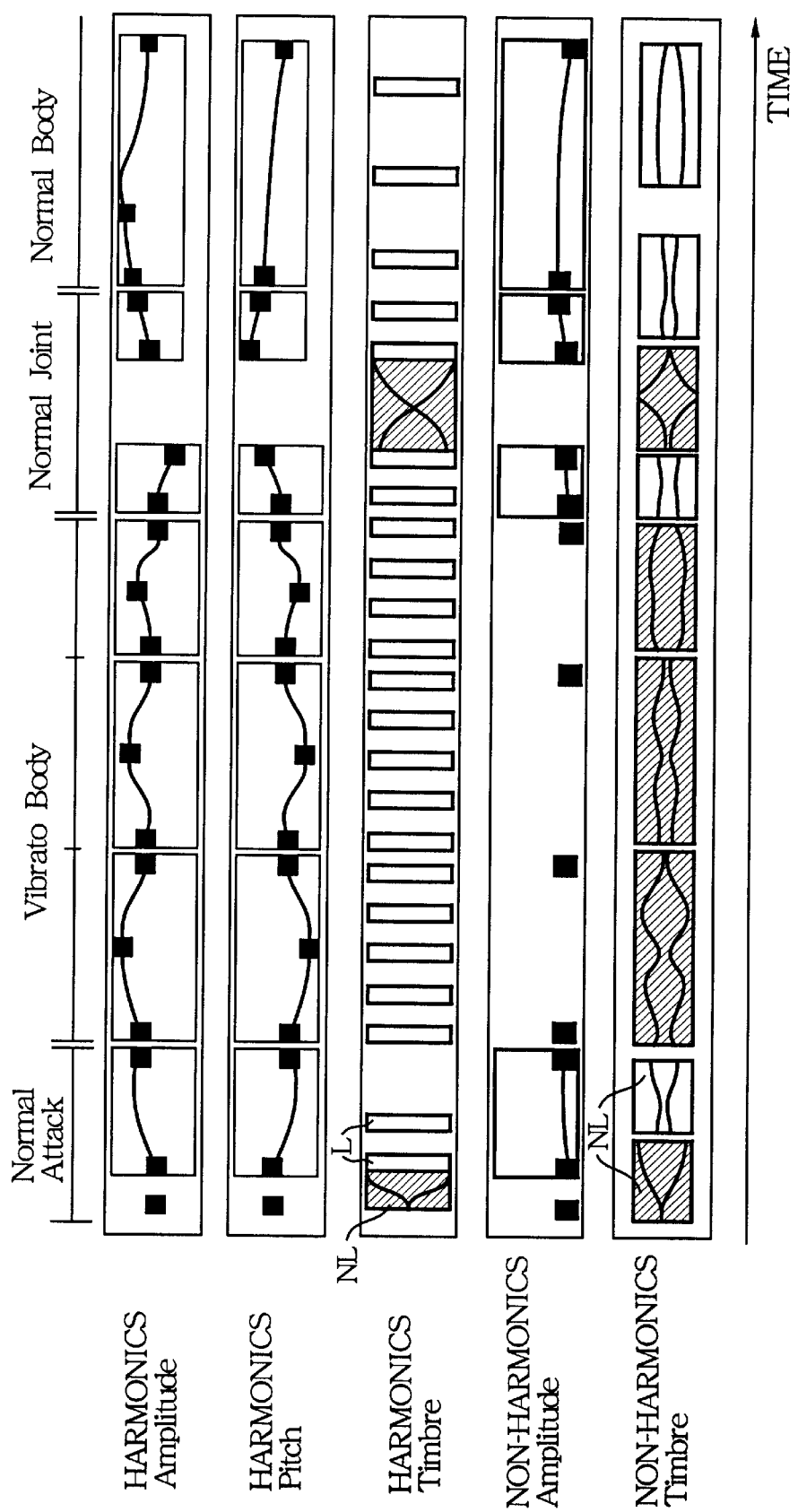
FIG. 14 is a schematic diagram for describing a packet stream generated in the performance synthesis section.

FIG. 14 schematically shows an example of the packet stream thus created. In FIG. 14, there are shown, from the top to the bottom, packet streams for the amplitude element, the pitch element, and the waveform (timbre) element in a harmonic component, and the amplitude element and the waveform (timbre) element in a non-harmonic component. Black squares represent typical points in the amplitude element and the pitch element in the harmonic component and the amplitude element in the non-harmonic component. A curve connecting these points represents a vector shape indicated by the vector ID contained in a packet of the packet stream. A white rectangle L represents a loop waveform for waveform (timbre) elements in the harmonic component and the non-harmonic component. Another rectangle NL represents a non-loop waveform. Shaded non-loop waveforms are especially characteristic ones. In this embodiment, two vectors are used to configure each of the waveform (timbre) elements for the harmonic component and the non-harmonic component in the NormalAttack module. One vector is used to configure each of the amplitude element and the pitch element for the harmonic component and the amplitude element for the non-harmonic component.

In this embodiment, the amplitude element and the pitch element contain no vectors at a portion where the waveform (timbre) element forms a non-loop waveform in the harmonic component or the non-harmonic component. However, it may be preferable to control a generated waveform by providing vectors to the amplitude element and the pitch element at a portion where the waveform (timbre) element forms a non-loop waveform. In the VibratoBody module, five vectors are used to configure the waveform (timbre) element in a harmonic component. One vector is used to configure each of the amplitude element and the pitch element in a harmonic component, and the waveform (timbre) element and the amplitude element in a non-harmonic component. Here, the VibratoBody is repeated three times. It should be noted that each repetition uses a different vector shape. This is because different performance parameters are specified for respective repetitions. According to different performance parameters, different element data is selected, or different level controls or timing axis controls are performed. In the NormalJoint module, three vectors are used to configure each of the waveform (timbre) elements in the harmonic component and the non-harmonic component. Two vectors are used to configure each of the amplitude element and the pitch element in the harmonic component, and the amplitude element in the non-harmonic component. Description about the NormalBody module is omitted.

As mentioned above, the performance synthesis section 101C generates a packet stream for each of the harmonic component and the non-harmonic component. Each of these packet streams comprises a plurality of packets. Each packet contains a vector ID and time information for the packet. In addition, a packet includes a value settled for each typical point in the case of the amplitude element and the pitch element in a harmonic component and the amplitude element in a non-harmonic component. Of course, the present invention is not limited thereto. It may be preferable to provide other information in addition to the vector ID and the packet's time information. A packet stream is configured for each component according to the content of each packet. The packet stream contains a plurality of packets and the time information (start time) about each packet.

Obviously, the number of packet streams may differ according to musical instrument types, etc.

Figure 15:
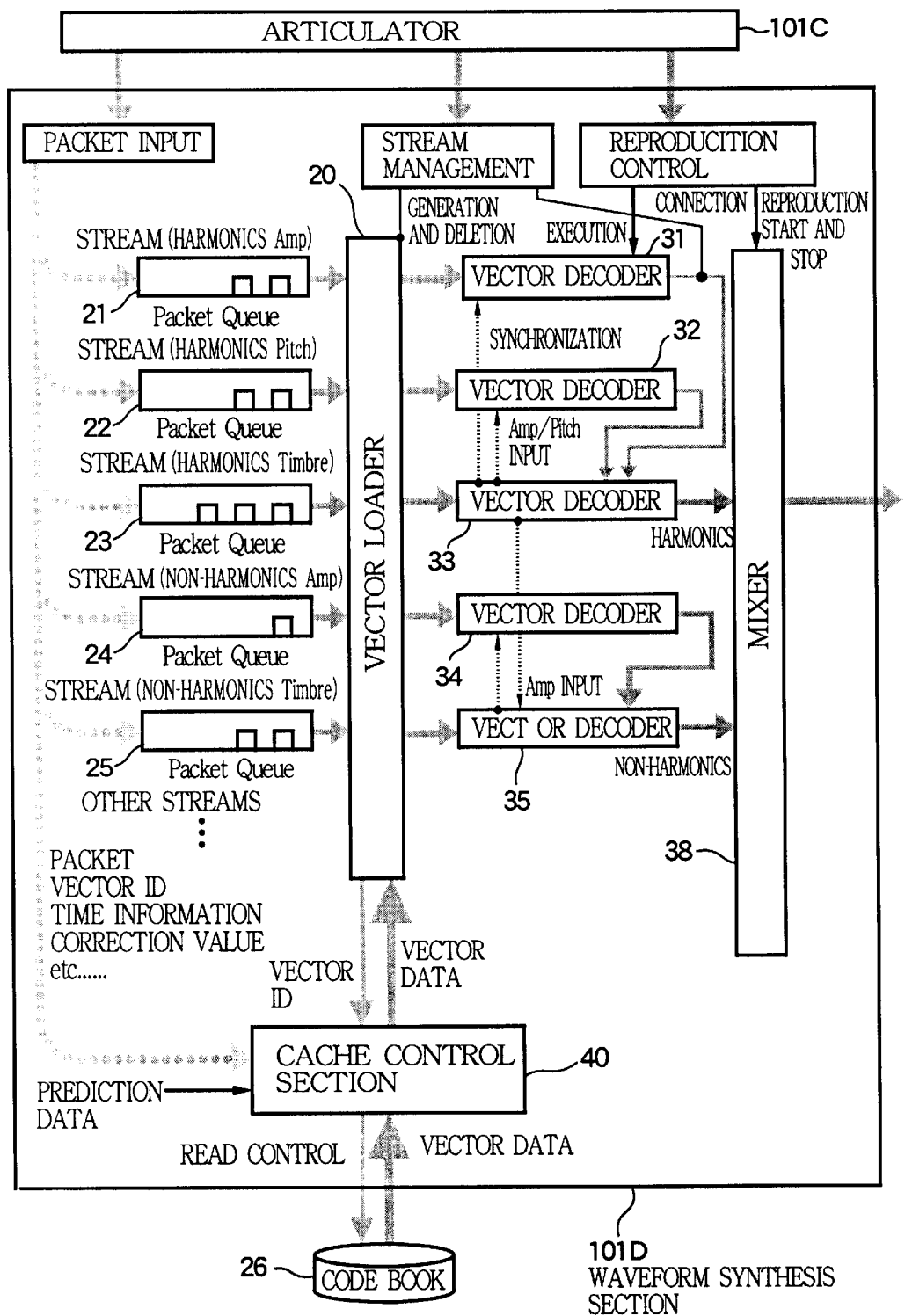
FIG. 15 schematically shows an embodiment of the overall configuration for explaining operations in the waveform synthesis section.
Figure 16:
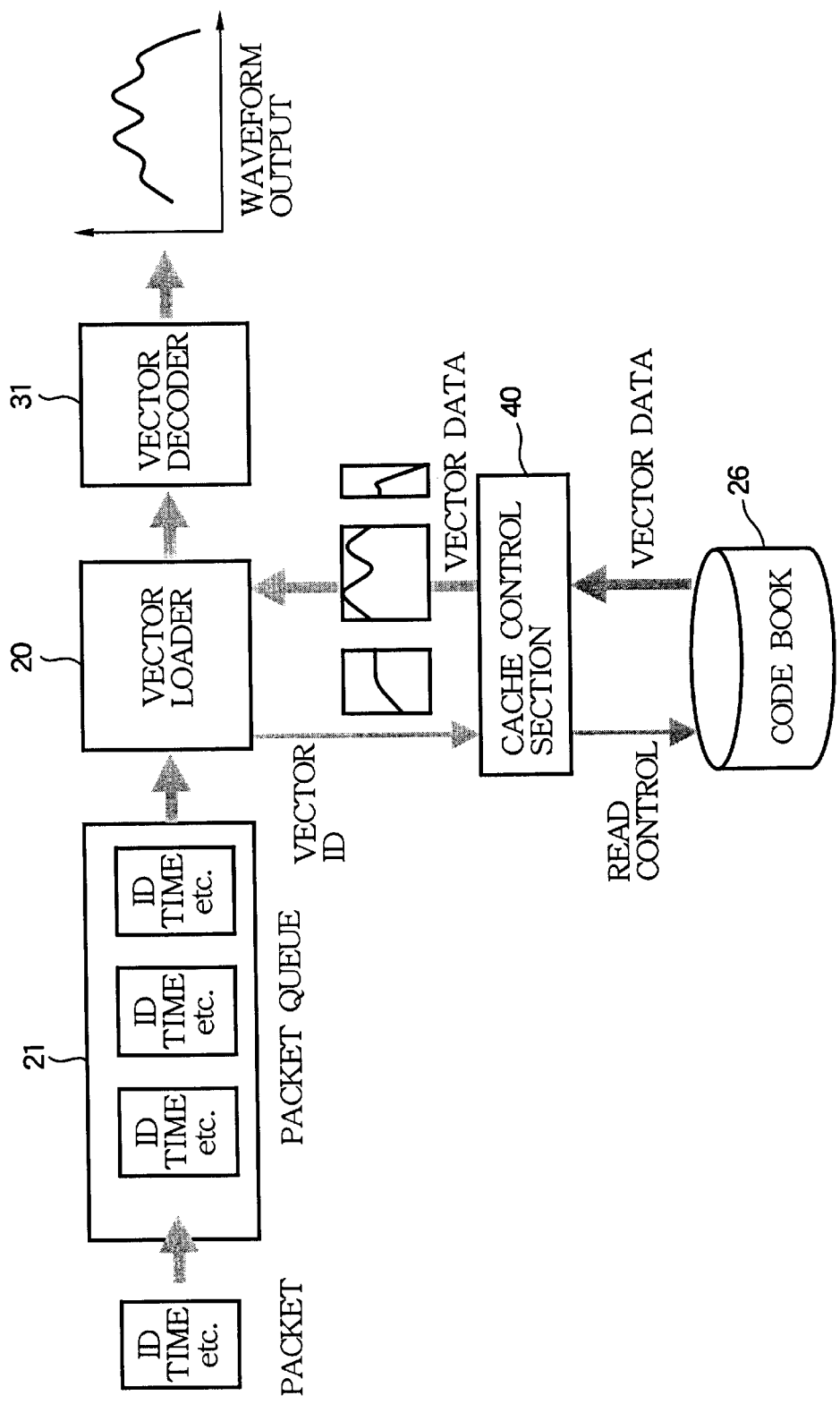
FIG. 16 is a block diagram for concisely showing a flow of the overall waveform synthesis.
Figure 17:
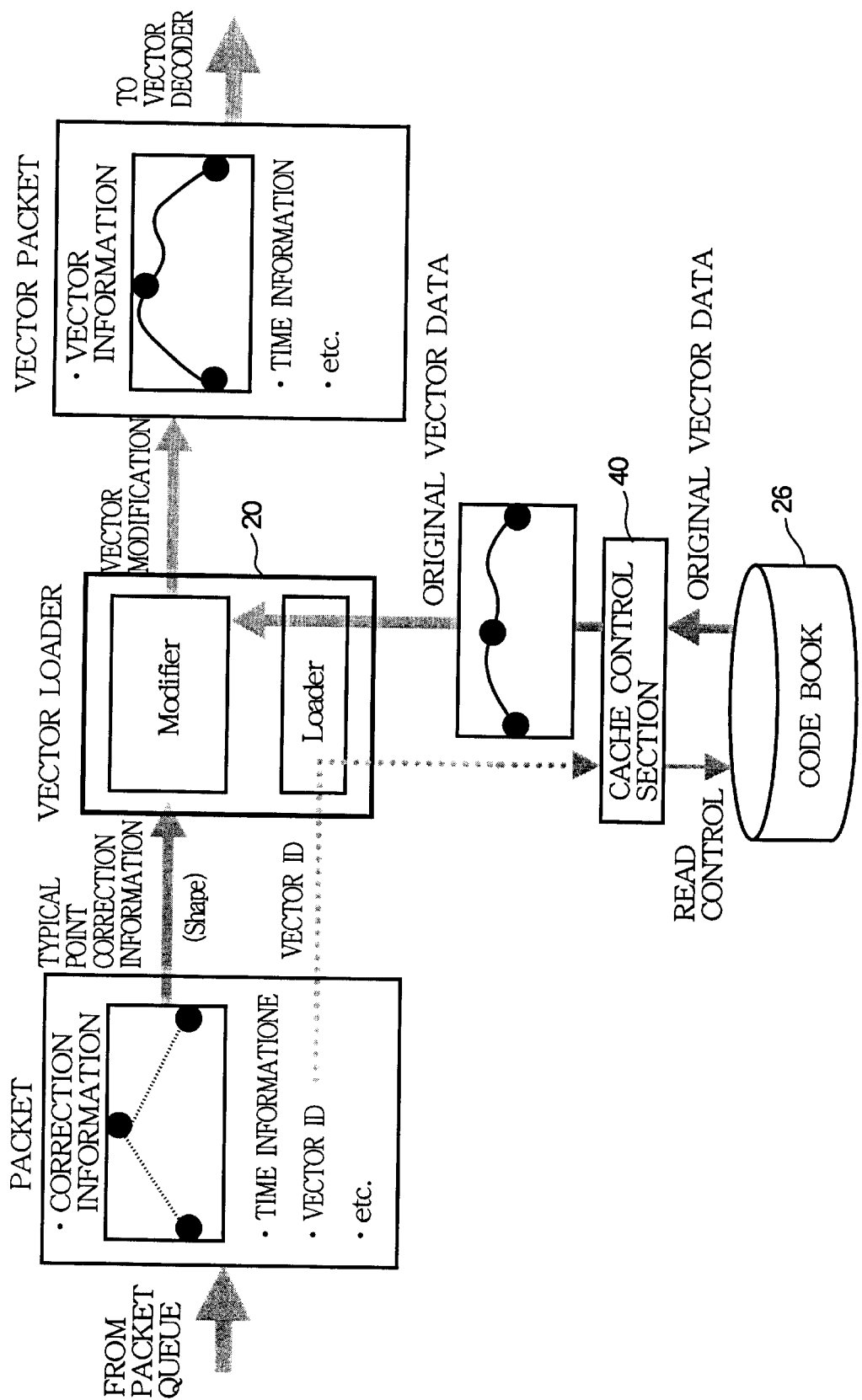
FIG. 17 is a block diagram for explaining a vector loader.
Figure 18:
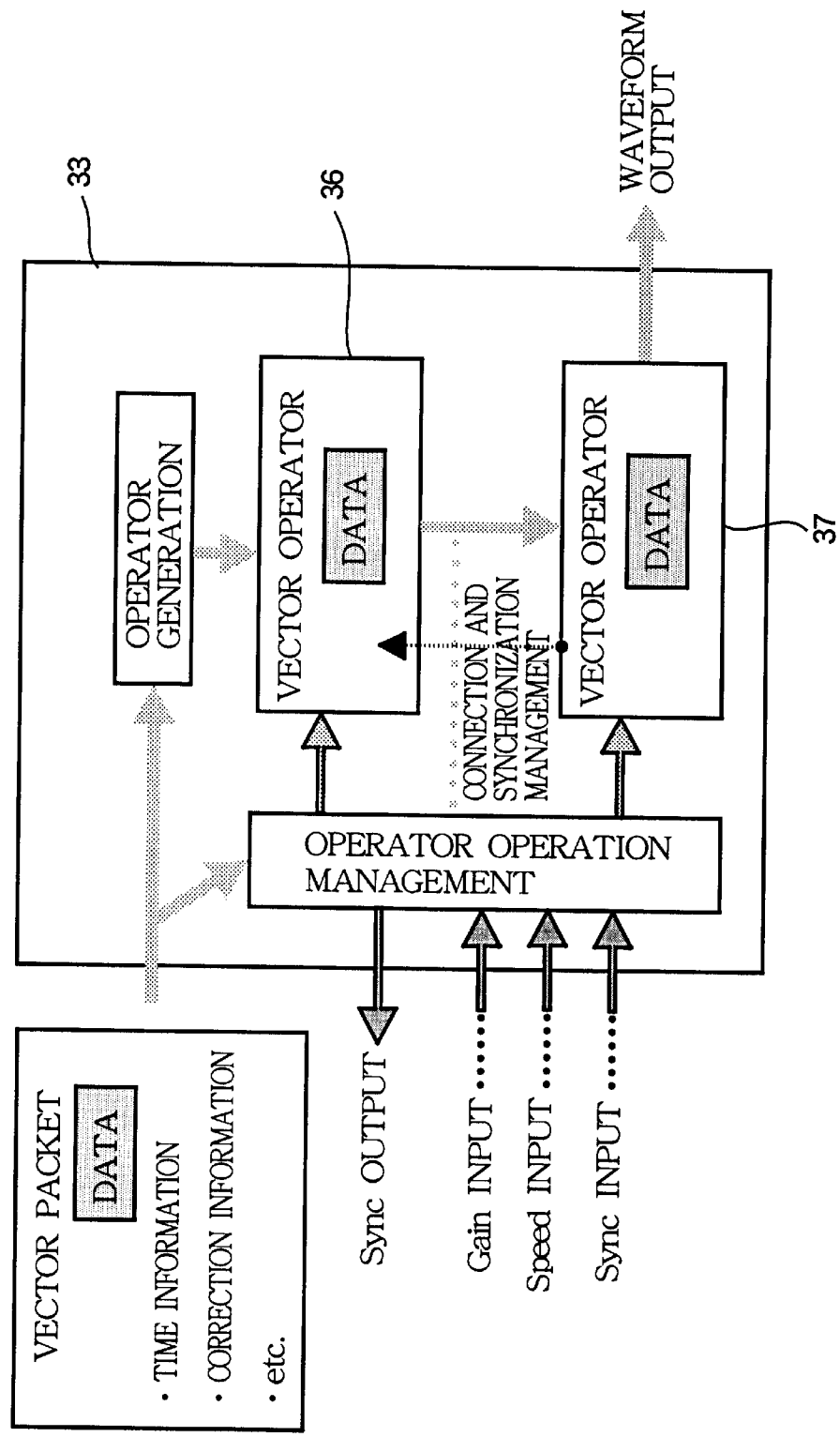
FIG. 18 is a block diagram for explaining a vector operator.
Figure 19:
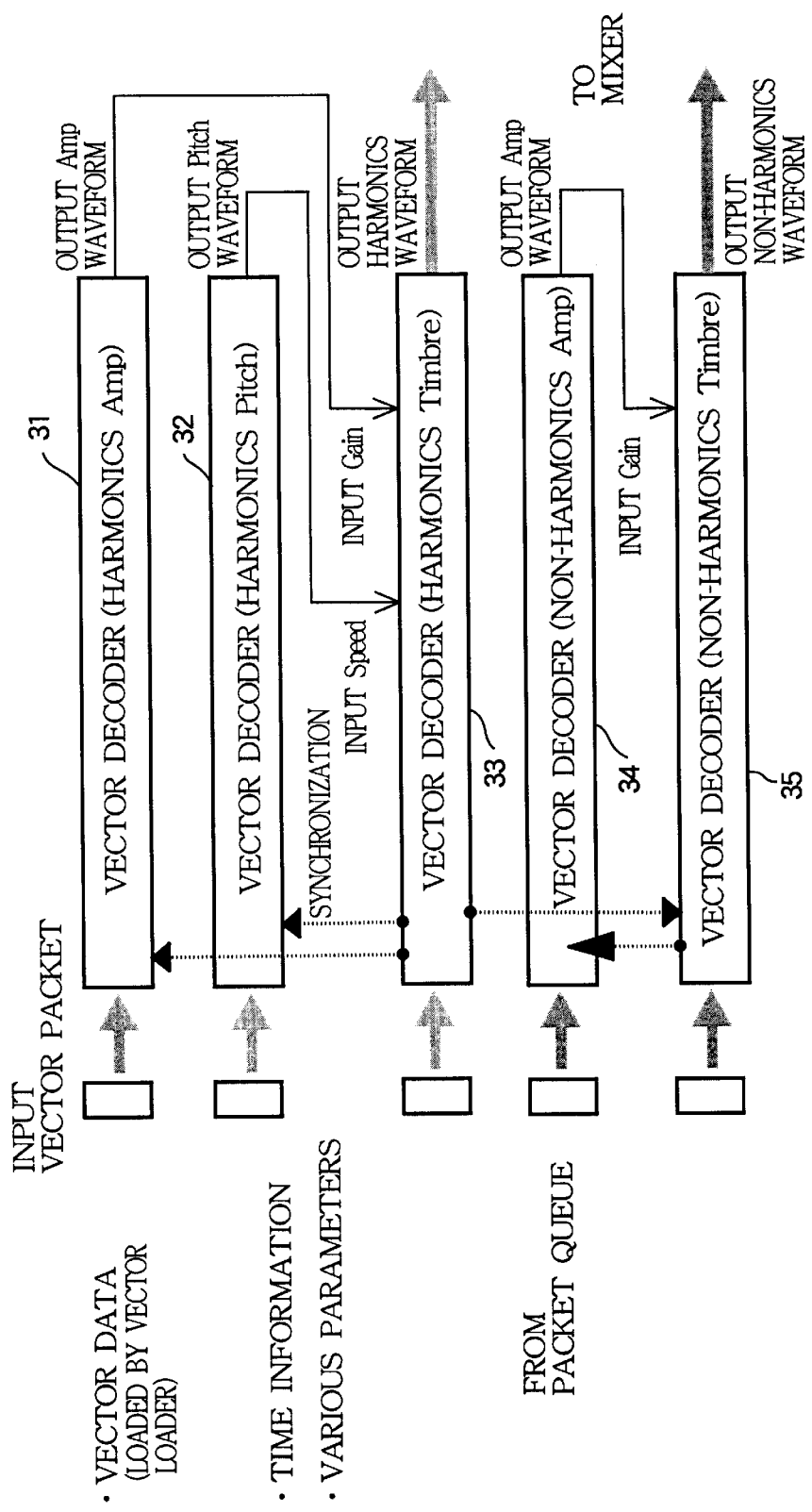
FIG. 19 is a block diagram for explaining a vector recorder.
Figure 22:
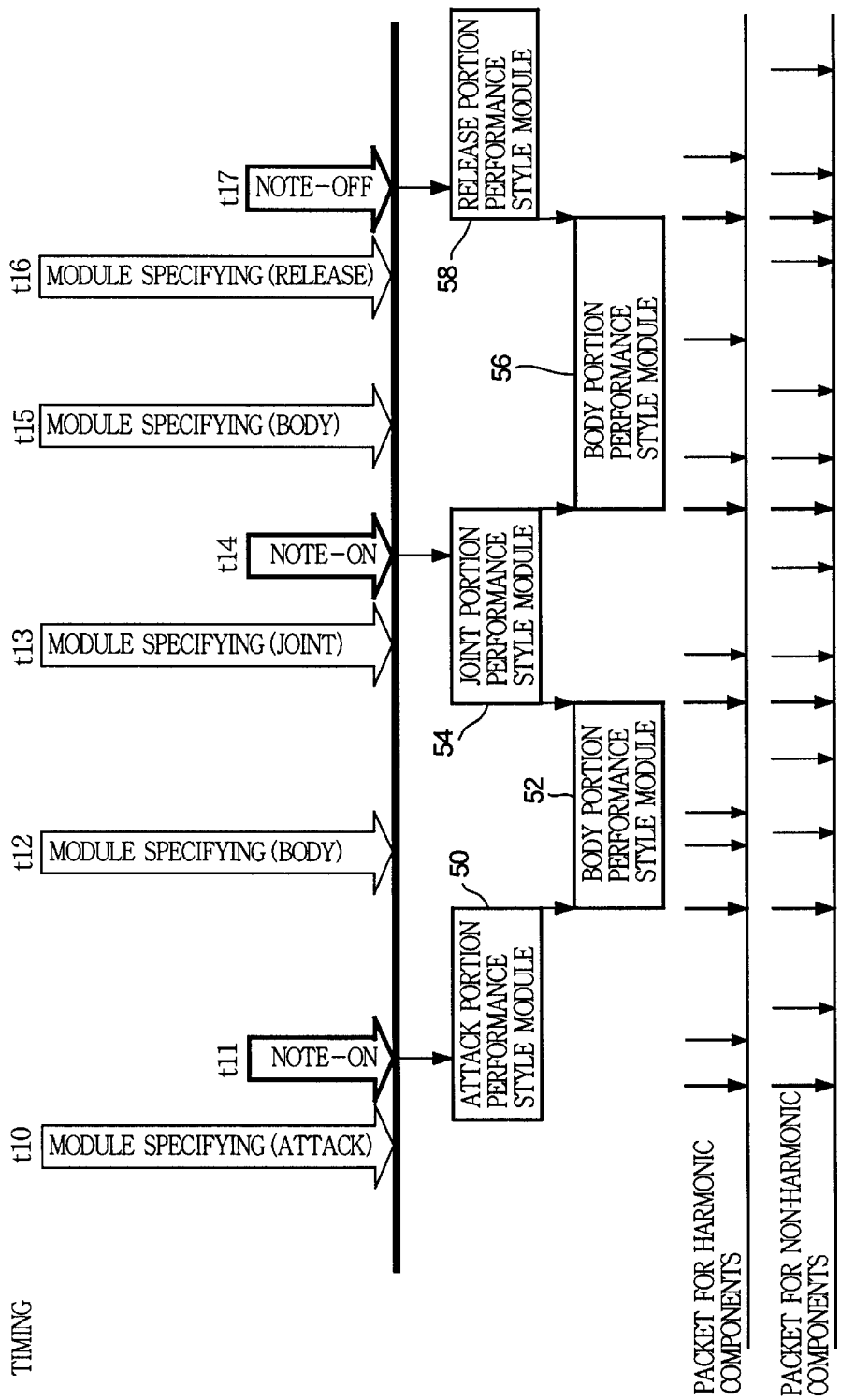
FIG. 22 shows the timing for supplying packets from the performance synthesis section to the waveform synthesis section.
Figure 23:
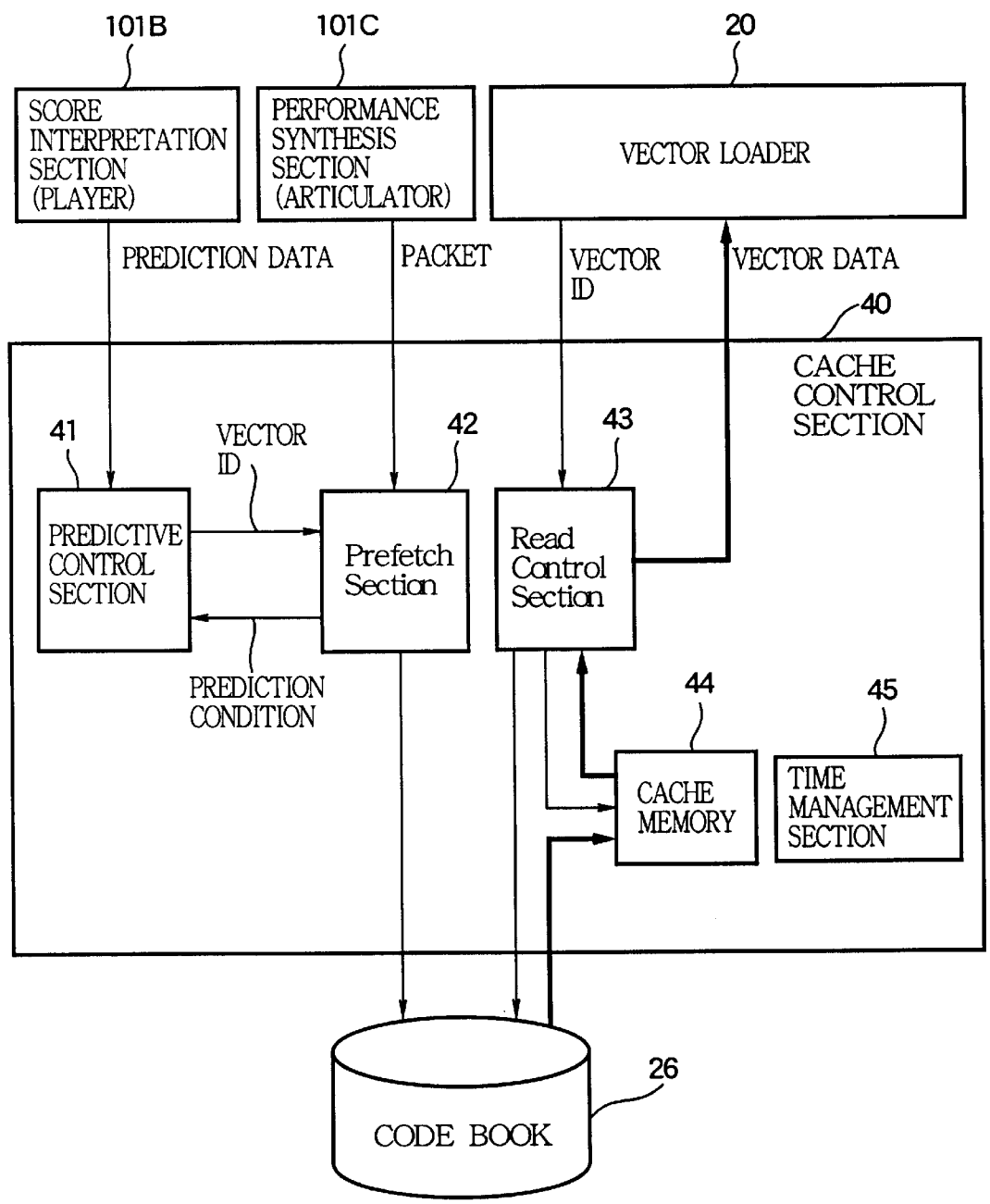
FIG. 23 is a block diagram showing an overall structure of the cache control section.

3.4 Waveform Synthesis Section 101D 3.4.1 Overall Operations of the Waveform Synthesis Section 101D The waveform synthesis section 101D synthesizes a waveform based on a packet stream (a sequence of a plurality of packets including vector ID, time information, correction information, etc.) for each component supplied from the performance synthesis section 101C. FIG. 15 schematically shows an overall configuration for explaining operations in the waveform synthesis section 101D. FIGS. 16 through 19, 22, and 23 illustrate in detail each operation in the waveform synthesis section 101D. FIG. 16 is a block diagram concisely showing an overall flow of the waveform synthesis. FIG. 17 is a block diagram for explaining a vector loader. FIG. 18 is a block diagram for explaining a vector operator. FIG. 19 is a block diagram for explaining a vector decoder. FIG. 22 shows timings for supplying packets from the performance synthesis section 101C to the waveform synthesis section 101D. FIG. 23 is a block diagram for explaining a cache control section 40.

In FIG. 15, the performance synthesis section (articulator) 101C creates a packet stream for each component element. The packet stream is then sequentially input to specified packet queue buffers 21 through 25 provided in the waveform synthesis section 101D corresponding to each component element on a packet basis (i.e., input in units of packets). Input packets are stored in the packet queue buffers 21 through 25 and are sequentially sent to a vector loader 20 in a specified order. The vector loader 20 references a vector ID in the packet and reads (loads) the original vector data corresponding to that vector ID from a code book 26 via a cache control section 40. The read vector data is sent to specified vector decoders 31 through 35. These vector decoders are provided corresponding to each component element and generate a waveform for each component element.

Further, the vector decoders 31 through 35 synchronize a waveform generated for each component element between the vector decoders 31 through 35 and generate a waveform for each of components (harmonic component and non-harmonic component). A waveform generated for each component is sent to a mixer 38. In addition to input of packets to packet queue buffers 21 through 25, the performance synthesis section (articulator) 101C performs various controls such as the stream management and the reproduction control for the waveform synthesis section 101D. The stream management relates to generation or deletion of individual vector data or connection between vector data. The reproduction control is responsible for generating a desired waveform or reproducing or stopping the generated desired waveform.

As mentioned above, the vector loader 20 is sequentially supplied with packets constituting a packet stream stored in the packet queue buffer 21. Based on the vector ID in each packet, the vector loader 20 reads vector data corresponding to that vector ID from the code book 26 via the cache control section 40. The vector loader 20 then sends the read vector data to the vector decoder 31 (see FIG. 16). At this time, each read packet may contain correction information (e.g., correction information about a typical point). In this case, the vector loader 20 modifies the read original vector data according to the correction information. The modified vector data is referred to as vector information data for distinction from the original vector data. The vector loader 20 outputs a packet having the vector information data as information to the vector decoders 31 through 35. This packet is referred to as a vector packet for distinction from a packet input from the performance synthesis section 101C. In this way, the vector loader 20 reads original vector data from the code book 26 based on the vector ID of a packet input from the performance synthesis section (articulator) 101C. The vector loader 20 corrects the vector data according to the correction information as needed and passes a vector packet to the vector decoders 31 through 35 (see FIG. 17). There can be various correction information about typical points for vector data such as correction information for shifting the time information based on random numbers, etc.

As shown in FIG. 18, the vector decoders 31 through 35 manage operations of various operators such as generating or discarding a vector operator for processing an input vector packet, managing connection or synchronization between vector operators, managing the time, setting the conversion to parameters for each vector operator input from other vector ID streams, etc. Vector operators 36 and 37 read vector information data, control a position (speed input) for reading the vector information data, control a gain (gain input), etc. Various parameters defined for the vector operators 36 and 37 are managed in the vector decoders 31 through 35. The vector decoders 31 through 35 are provided so as to correspond to each component element. The corresponding vector decoders 31 through 35 read vector information data from the vector packet and chronologically generate a desired waveform.

As shown in FIG. 19, for example, a vector decoder 31 generates an envelope waveform for the amplitude element in the harmonic component. A vector decoder 32 generates an envelope waveform for the pitch element in the harmonic component. A vector decoder 33 generates an envelope waveform for the waveform (timbre) element in the harmonic component. A vector decoder 34 generates an envelope waveform for the amplitude element in the non-harmonic component. A vector decoder 35 generates an envelope waveform for the waveform (timbre) element in the non-harmonic component. The vector decoder 33 generates a harmonic component waveform provided with the envelope waveform for the amplitude element in the harmonic component and the envelope waveform for the pitch element in the harmonic component. These envelopes are generated in the vector decoders 31 and 32. The vector decoder 33 then outputs the generated waveform to the mixer 38. Namely, the vector decoder 33 is supplied with the envelope waveform for the amplitude element in the harmonic component as a vector operator for gain control (gain input). It is supplied with the envelope waveform for the pitch element in the harmonic component as a vector operator for read position control (speed input) of vector information data. The vector decoder 35 generates a non-harmonic component waveform provided with the envelope waveform for the amplitude element in the non-harmonic component. This envelope is generated in the vector decoder 34. The vector decoder 35 then outputs the generated waveform to the mixer 38. Namely, the vector decoder 35 is supplied with the envelope waveform for the amplitude element in the non-harmonic component as a control command for gain control (gain input).

When waveforms are chronologically generated in each component and element, the vector decoders 31 through 35 synchronize the waveforms for waveform generation. For example, when a vector packet for the waveform (timbre) element and a vector packet for the amplitude element are input, an amplitude waveform based on the vector packet for the amplitude element is generated with reference to and in synchronization with the time for waveform generation based on the vector packet for the waveform (timbre) element. This amplitude waveform controls the amplitude of a waveform generated on the basis of the vector packet for the waveform (timbre) element. When a vector packet for the waveform (timbre) element and a vector packet for the pitch element are input, a pitch waveform based on the vector packet for the pitch element is generated with reference to and in synchronization with the time for waveform generation based on the vector packet for the waveform (timbre) element.

This pitch waveform controls the pitch of a waveform generated on the basis of the vector packet for the waveform (timbre) element. When a vector packet for the waveform (timbre) element in the harmonic component and a vector packet for the waveform (timbre) element in the non-harmonic component are input, a non-harmonic component based on the vector packet for the waveform (timbre) element in the non-harmonic component is synthesized with reference to and in synchronization with the time for harmonic component synthesis based on the vector packet for the waveform (timbre) element in the harmonic component. A desired musical sound waveform is generated by mixing waveforms for the synthesized harmonic component and non-harmonic component.

This embodiment may be configured so as to select synchronization or asynchronization between a harmonic component and a non-harmonic component. Only when the synchronization is selected, it may be preferable to synthesize a non-harmonic component waveform generated on the basis of the vector packet for the waveform (timbre) element in the non-harmonic component with reference to and in synchronization with the time for waveform synthesis of a harmonic component generated on the basis of the vector packet for the waveform (timbre) element in the aforementioned harmonic component.

As mentioned above, a packet stream comprises a plurality of packets. In the case of a packet stream of vector packets, each packet contains vector data. Namely, a packet stream comprises vector data arranged along a temporal direction. Vector data contains different data structures and meanings according to the amplitude, pitch, and waveform (timbre) elements. However, vector data is basically the same from the viewpoint of the vector operators 36 and 37.

3.4.2 Vector Data Structure

Figure 20:
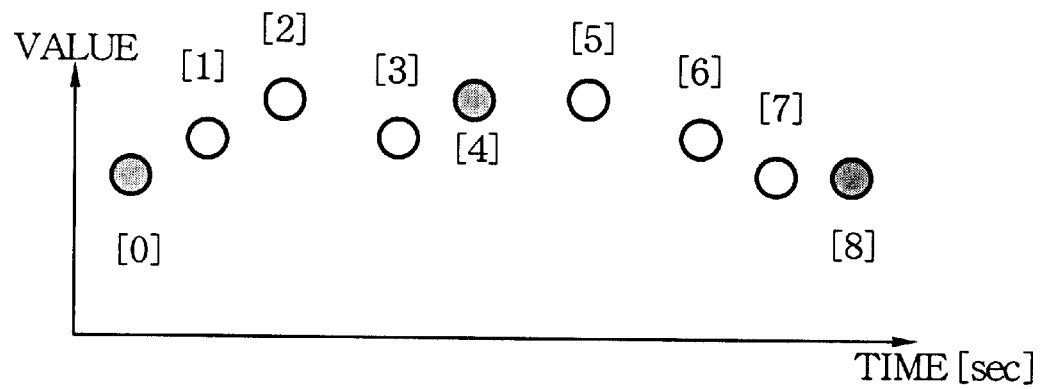
FIG. 20 schematically shows an embodiment of the data structure of vector data.

FIG. 20 schematically shows an embodiment of the vector data structure. For example, a position for reading vector data is expressed in units of [SEC]. When a read speed is assumed to be constant, one sample on the vector data matches one sample of an output waveform. A read speed is expressed in units of 1/1200 [cent] (2 to the nth power). Exponent n=0 means a constant speed. Exponent n=1.0 means a double speed, e.g., an octave higher for the waveform (timbre) element. Exponent n=−1.0 means a half speed, e.g., an octave lower for the waveform (timbre) element (see the top chart in FIG. 20). The code book 26 stores actual vector data. For example, vector data for the amplitude element or the pitch element comprises an array of VECTORPOINT structures and typical point data.

An array of VECTORPOINT structures contains a sample position and a value for each point in a sequential order. For example, a vector data value for the amplitude element is expressed in units of [db]. A vector data value for the pitch element is expressed in units of 1/1200 [cent] when MIDI note number 0 is assumed to be 0.0. The typical point data is a DWORD array and stores an index number for an array of VECTORPOINT structures to be used as a typical point (see the bottom chart in FIG. 20). Obviously, the present invention is not limited to the aforementioned example.

3.4.3 Detail of the Cache Control Section 40

(1) Overall Configuration of the Cache Control Section 40

This section describes an overall configuration of the cache control section 40 with reference to FIG. 23. First described is the objective of providing this cache control section 40. Since the code book 26 is stored in the hard disk 109, vector data needed for the vector decoders 31 through 35 is read from the hard disk 109. However, a hard disk etc. offer a slow and unstable access speed. It is impossible to immediately read vector data at the timing when the vector decoders 31 through 35 process the relevant vector data. As a solution, this embodiment provides the cache control section 40 in the waveform synthesis section 101D to load vector data to be used (or expected to be used) into the cache memory.

In FIG. 23, the reference numeral 42 denotes a pre-fetch section. The pre-fetch section extracts a vector ID from a packet supplied to the waveform synthesis section 101D from the performance synthesis section 101C. The pre-fetch section provides read control to the hard disk 109 so as to pre-fetch vector data associated with this vector ID from the code book 26. As mentioned above, those packets constitute a packet stream in the packet queue buffers 21 through 25 and are to be read by the vector loader 20. Concurrently, a pre-fetch process takes place.

The reference numeral 41 denotes a predictive control section. The predictive control section predicts vector data having a high possibility of actual use based on prediction data (program change, etc.) supplied from the score interpretation section 101B and a prediction condition supplied from the pre-fetch section 42. The predictive control section then supplies a vector ID associated with the predicted vector data to the pre-fetch section 42. Incidentally, the vector IDs supplied to the pre-fetch section 42 may contain those associated to failed vector data which may not be actually used in the future. Here, the "prediction condition" contains a vector ID etc. settled to be used (i.e., supplied from the performance synthesis section 101C). In this way, the pre-fetch section 42 is supplied with vector IDs from the performance synthesis section 101C and the predictive control section 41. Thew pre-fetch section 42 pre-fetches vector data associated with both vector IDs while prioritizing a load of vector data settled to be used (i.e., a load of vector data specified from the performance synthesis section 101C). Loading vector data settled to be used is referred to as "designative load"; loading vector data not settled to be used (just predicted to be used) is referred to as "predictive load" hereinafter. The reference numeral 44 represents cache memory which stores pre-fetched vector data. The reference numeral 43 represents a read control section. When receiving a vector ID from the vector loader 20, the read control section mainly reads vector data corresponding to this vector ID from the cache memory 44 and supplies that vector data to the vector loader 20. The reference numeral 45 represents a time management section which provides timing control for pre-fetching, etc.

(2) Operations of the Predictive Control Section 41

Figure 24:
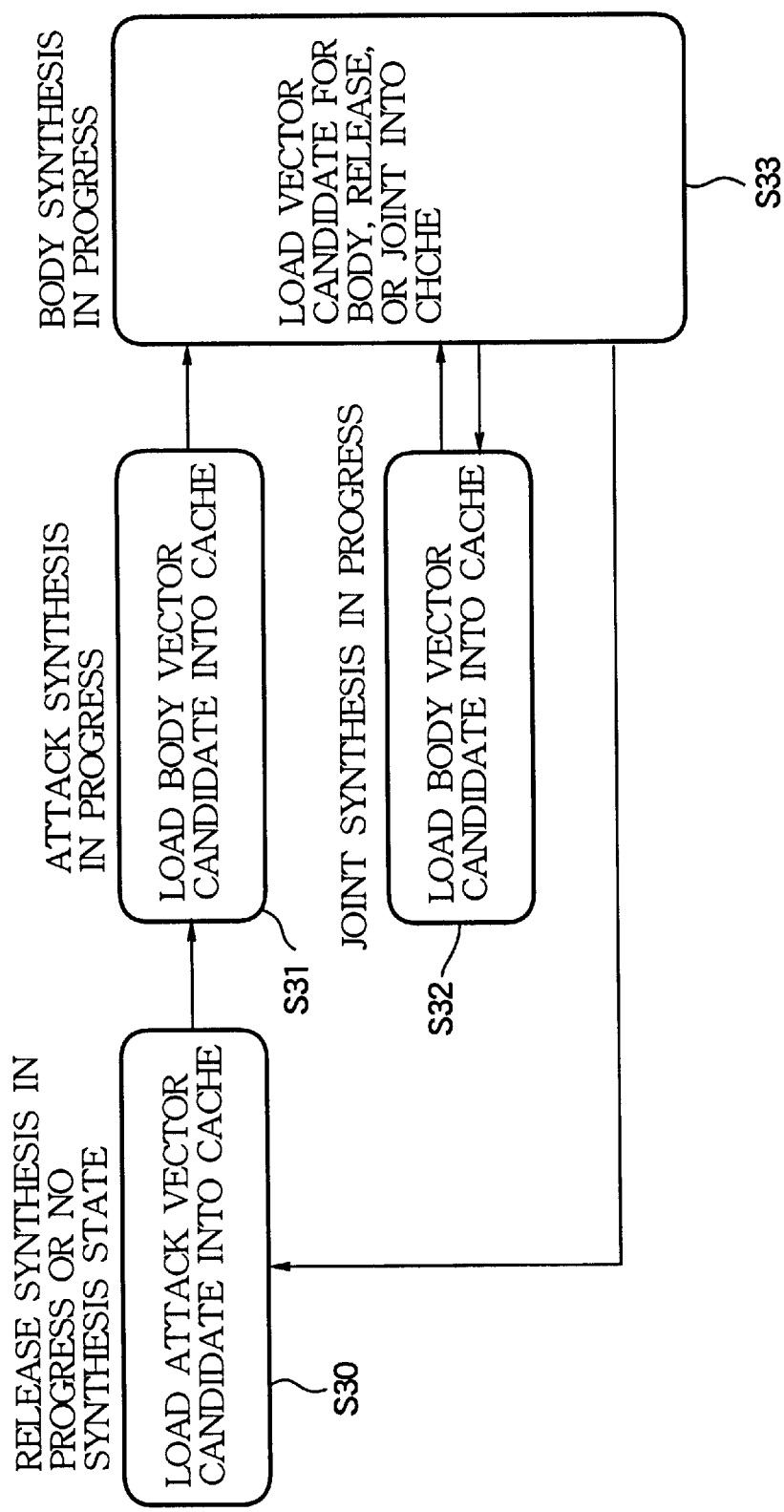
FIG. 24 is a state transition diagram for prediction operations in the predictive control section.

The following describes processing contents in the predictive control section 41 with reference to the state transition diagram in FIG. 24. The state of the predictive control section 41 depends on whether or not a waveform synthesis takes place in the vector decoders 31 through 35 and, when the synthesis takes place, depends on which module a wave is synthesized for. Initially, no waveform synthesis takes place in the vector decoders 31 through 35. The predictive control section 41 performs a process at step S30. Here, the process predicts a candidate for vector data in the attack portion. Predicted vector IDs are successively supplied to the pre-fetch section 42. At step S30, however, the attack portion is not predicted unless a "program change" is supplied as prediction data from the score interpretation section 101B. This is because an undefined program change causes a large amount of vector data for specifiable attack portions. In an initial state, when a program change is supplied from the score interpretation section 101B, the predictive control section immediately starts a predictive load of vector data for the attack portion corresponding to that program change.

For example, it is assumed that "piano" is specified as the program change and there are 100 types of vector data for the attack portion associated with "piano". In this case, the predictive control section starts a predictive load of 100 types of vector data. When a packet is settled for the attack portion, the vector loader 20 and the vector decoders 31 through 35 start a waveform synthesis process for the attack portion. At this time, the state of the predictive control section 41 shifts to step S31.

At step S31, a predictive load is performed with respect to vector data candidates for the body portion based on the vector ID for the settled attack portion. Since the attack portion pitch is known, the candidate vector data is limited to that corresponding to the same pitch as for the attack portion. Vector data is further limited to those for the body portion which corresponds to the envelope waveform etc. for the settled attack portion and has a possibility of connection to it. At step S31, the predictive control section predictively loads candidates narrowed down according to these conditions. Here, the performance synthesis section 101C actually supplies packets for the body portion. When a packet for the body portion is settled, the state of the predictive control section 41 shifts to step S33.

At step S33, the predictive control section predictively loads candidates for the next vector data based on the vector ID for the settled body portion. As mentioned above, a module associated with the body portion is one of the other body portions, joint portions, or release portions. Accordingly, the predictive control section 41 predictively loads these vector data. In the same manner as step S31, candidates for vector data to be predictively loaded are narrowed down according to the pitch, the envelope waveform, etc. of the settled body portion.

When the performance synthesis section 101C actually supplies a packet during execution of step S33, the state of the predictive control section 41 changes according to that packet. When the supplied packet is associated with the body portion, the state remains at step S33. Based on this body portion, a predictive load is re-executed for the other body portions, joint portions, or release portions. When the supplied packet is associated with the joint portion, the state of the predictive control section 41 shifts to step S32.

At step S32, the predictive control section predictively loads vector data for the body portion. Candidates for the vector data to be predictively loaded are narrowed down to vector data for the body portion having a possibility of connection to the settled joint portion. When the performance synthesis section 101C supplies a packet associated with the next body portion, the state of the predictive control section 41 returns to step S33 to predictively load vector data for the other body portions, joint portions, or release portions. When the performance synthesis section 101C supplies a packet for the release portion, the state of the predictive control section 41 shifts to step S30.

At step S30, as mentioned above, the predictive control section predictively loads candidates for vector data for the attack portion. When the pitch for the just preceding release portion is already settled, it is highly possible that a pitch for the succeeding attack portion does not deviate greatly. During synthesis of the release portion, it may be preferable to limit vector data for the attack portion to be loaded predictively to those around the pitch for that release portion (e.g., within the range of ±1 octave).

Figure 25:
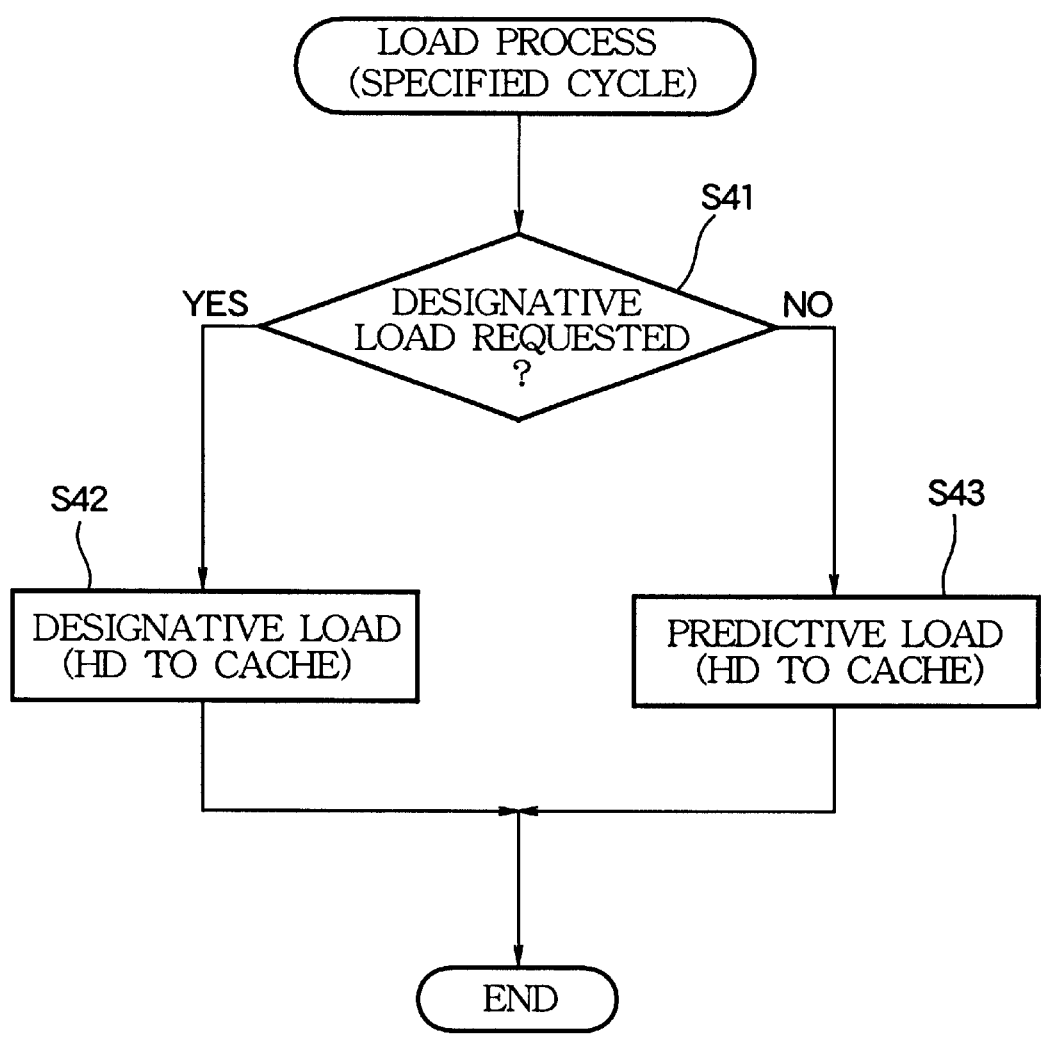
FIG. 25 is a flowchart which shows a load process performed in the pre-fetch section.

(3) Operations of the Pre-Fetch Section 42
(3.1) Load Process (FIG. 25)

The following describes operations of the pre-fetch section 42. First, the pre-fetch section 42 performs a load process as shown in FIG. 25 at a specified cycle. When the process proceeds to step S41 in the figure, it is determined whether or not to receive a designative load request which is not executed yet. When it is determined to be YES, the process proceeds to step S42 to perform a designative load for the requested vector data. After a lapse of given read time, these vector data are read from the hard disk 109 and are stored in the cache memory 44.

When it is determined to be NO at step S41, the process proceeds to step S43 to perform a predictive load. Of vector data requested for the predictive load, the process detects vector data for which a read command is issued to the cache memory 44 (vector data already loaded into the cache memory 44 and those scheduled to be loaded according to the other load requests); and vector data for which no read command is issued to the hard disk 109. The hard disk 109 is supplied with a command to read the latter. When there are many vector data to be loaded predictively, this routine may be re-called in the middle of the predictive load. In such a case, as long as the requested designative load takes effect, the relevant predictive load is interrupted and the designative load is performed via step S42. In the pre-fetch section 42, a designative load takes precedence over a predictive load.

Figure 26:
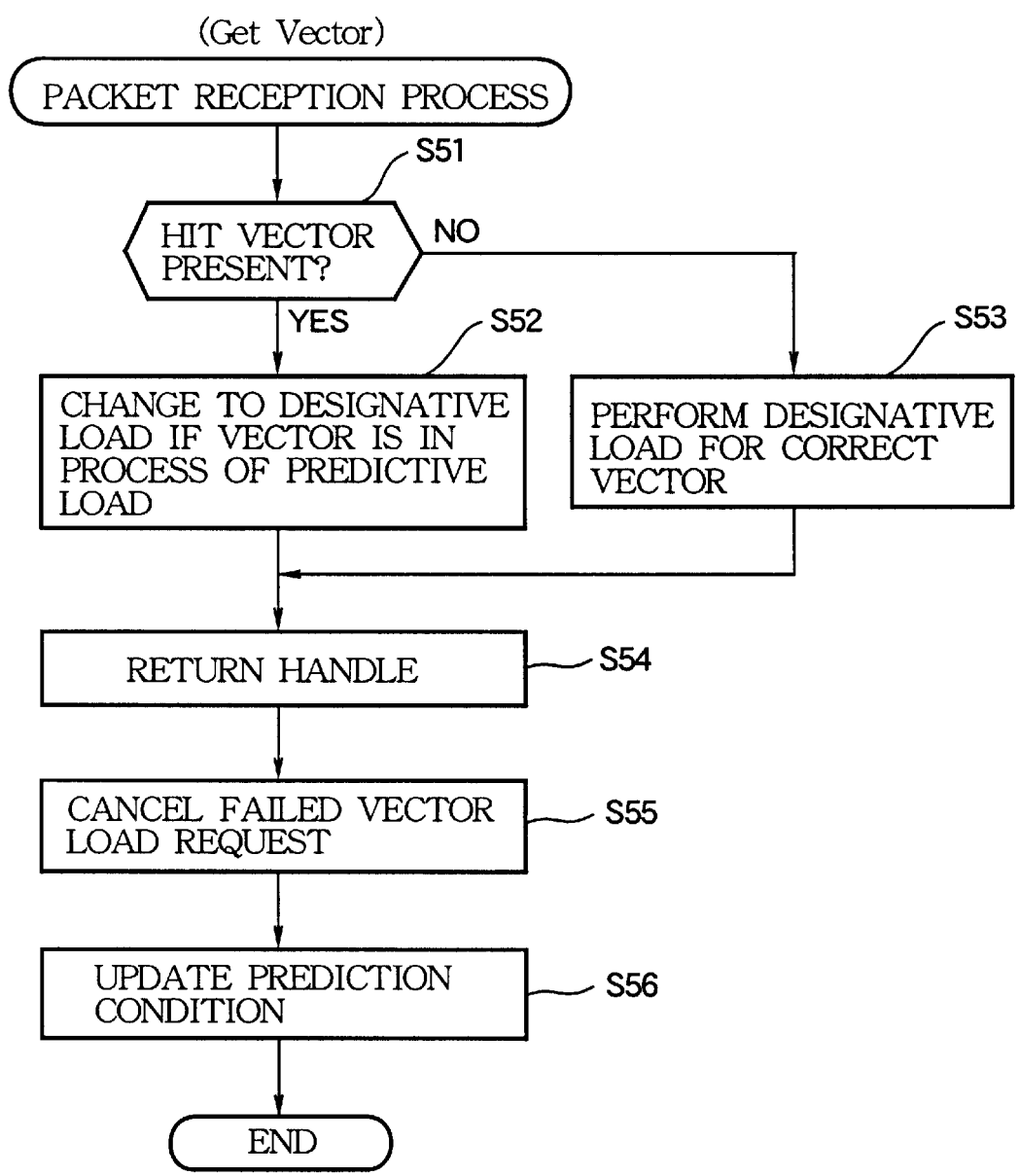
FIG. 26 is a flowchart which shows a packet reception process performed in the pre-fetch section.

(3.2) Packet Reception Process (FIG. 26)

The pre-fetch section 42 also performs a packet reception process in FIG. 26 each time the performance synthesis section 101C supplies a packet. When the process proceeds to step S51 in the figure, a vector ID is extracted from the supplied packet to determine whether or not to hit the vector data corresponding to that vector ID. Here, "hitting the vector data" is applicable (1) when any vector data is hit out of those already predictively loaded into the cache memory 44, (2) when the vector data is not yet loaded into the cache memory 44 but is scheduled for the predictive load, or (3) when a once loaded and used vector data (USED state) can be used as is.

In this embodiment, the used vector data is not released immediately, but temporarily remains in the cache memory 44 as vector data in the "USED state". When the storage capacity has become too small to store other vector data, for example, an area for the USED-state vector data is released to store new vector data. The detail will be described later.

When there is no hit vector data, step S51 is determined to be NO. The process proceeds to step S53. Here, a designative load request occurs for a vector ID contained in the aforementioned packet. When the packet reception process (FIG. 26) is performed next, a designative load is performed for that vector data.

When there is hit vector data, step S51 is determined to be YES. The process proceeds to step S52. If the predictive load for that vector data is incomplete, the predictive load request is changed to a designative load request. This is because that vector data is loaded preferentially when the packet reception process is performed afterwards. When the process proceeds to step S54, the process returns a handle for the specified-load-requested vector data to the performance synthesis section 101C. This handle uniquely corresponds to each vector data. When the specified-load-requested vector data is already stored in the cache memory 44, the handle for that vector data is returned. Otherwise, a new handle is generated and is returned to the performance synthesis section 101C.

When the process proceeds to step S55, the process cancels predictive load requests which occurred previously and unsuccessfully. Specific contents of "cancel" will be described later. When the process proceeds to step S56, the process changes prediction conditions in the predictive control section 41. Namely, the process narrows candidates for the predictive load in each state in FIG. 24 or changes the state of the predictive control section 41 according to a packet supplied from the performance synthesis section 101C.

Figure 28:
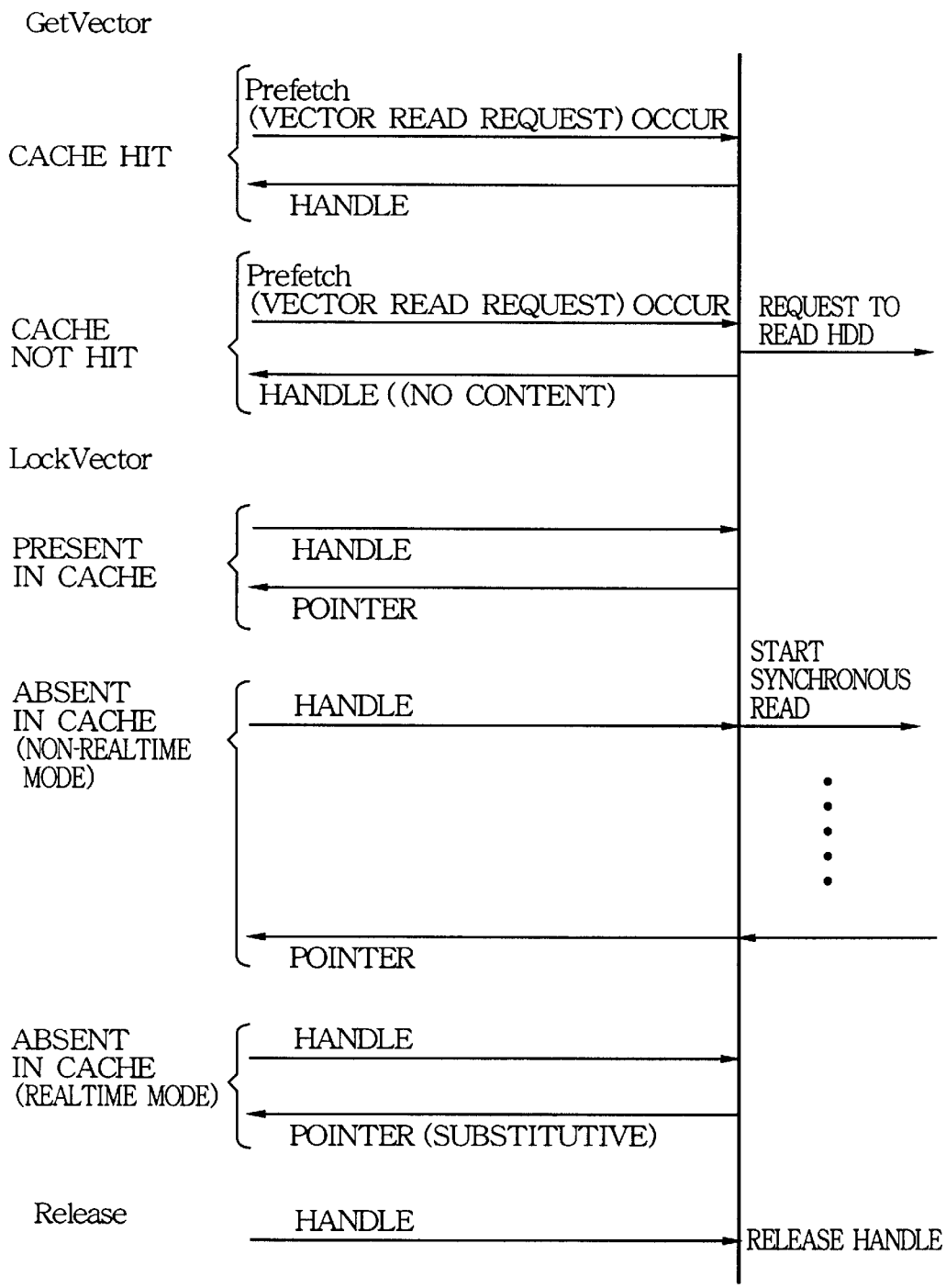
FIG. 28 is a signal flow diagram between the performance synthesis section and the waveform synthesis section.

This packet reception process is equivalent to a "GetVector command" in FIG. 28 viewed from the performance synthesis section 101C. Namely, the performance synthesis section 101C supplies a packet to the waveform synthesis section 101D. This operation is just the same as sending a GetVector command to "get vector data" based on the vector ID included in the packet. This vector data must be prepared until it is read by the vector loader 20 later. At that point, a handle is required to specify intended vector data out of many.

Figure 27:
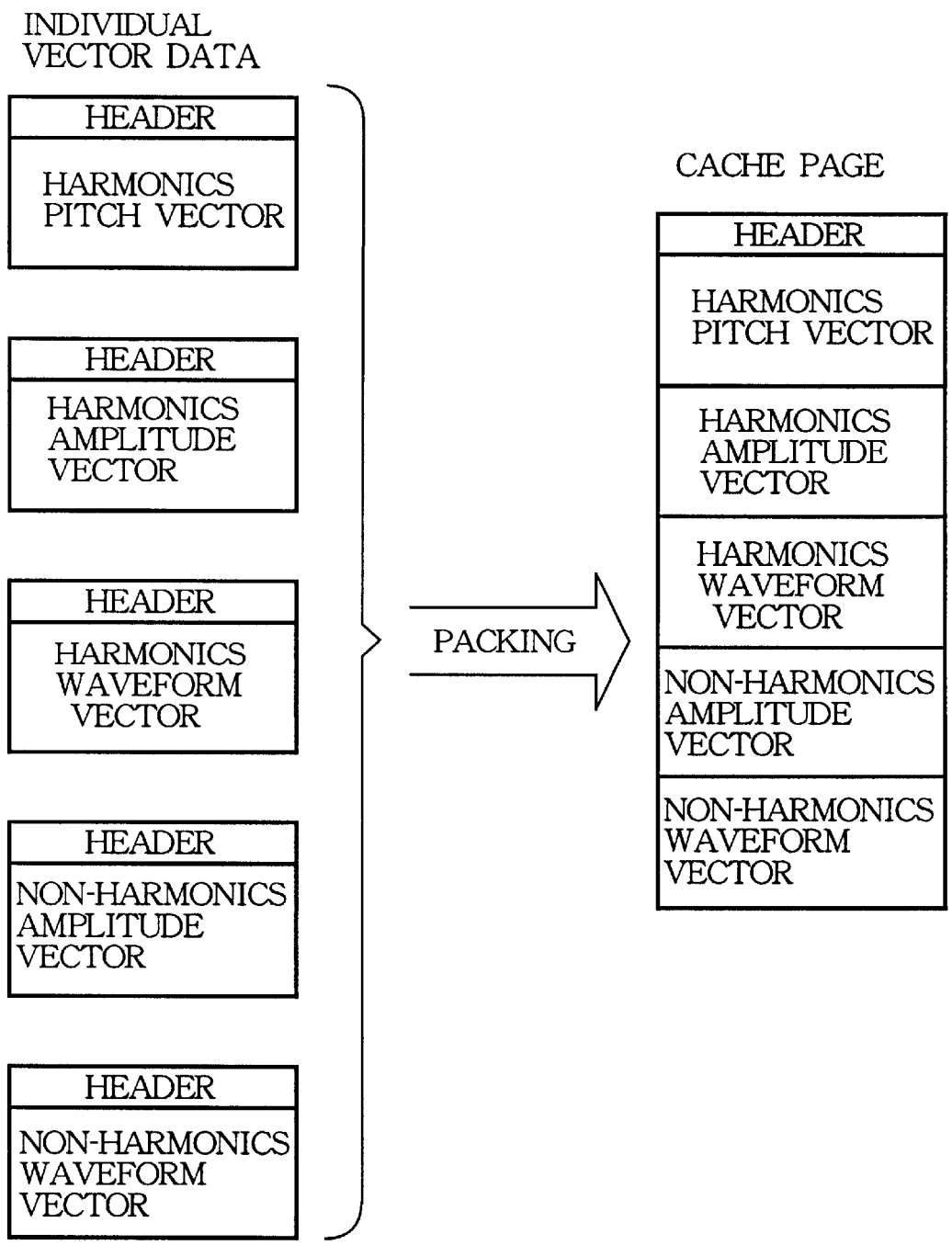
FIG. 27 describes operations for configuring a cache page.

(4) Data Structure in the Cache Memory 44
(4.1) Cache Page (FIG. 27)

The cache memory 44 may store vector data to be used concurrently. These vector data are packed and are converted to one file (or a plurality of files fewer than or equal to the total number of vector data). This conversion is automatically executed prior to the musical performance according to a user's instruction or created song data. FIG.

27 shows an example. In FIG. 27, some vector data read from the code book 26 are subject to a designative load. These vector data include the time information. Accordingly, it is possible to extract a plurality of vector data to be used concurrently. Vector data read from the code book contain respective headers. Vector data to be used concurrently are collected in a file, for example. This file is given a common header. This can shorten the time for the vector loader 20 to access each vector data.

This file header contains the following information.

Data ID: Stores a 4-byte identification character "PACK" for identifying the file type.

Data Size: Indicates the file data size.

VQ Type: Indicates the type of stored vector data.

Version: Indicates the file format version.

An application program running on a personal computer implements the waveform generator according to this embodiment. The system memory contains its cache. When vector data is cached, cache control is provided on the basis of a cache page with a specified size, not on the basis of single vector data (with a free size). Namely, single cache data is divided into a plurality of cache pages and is cached for management in units of cache pages. The system memory stores cache management data (page header) corresponding to each cache page. Normally, a hard disk stores data on the basis of a fixed-size cluster. A cache page size is preferably the same as the cluster size or an integral multiplication of that size. Considering the vector data size, etc., it is appropriate to set the cache page size to 1 through 10 kilobytes.

(4.2) Data Structure of the Page Header

The following describes the data structure of the header provided to each cache page. Each header comprises a VDDLCSPAGE structure which has the following members.

dwPage: A page number uniquely assigned to the cache page.

dwID: Vector ID of vector data contained in this cache page.

dwSize: A data size of this cache page.

dwCount: Indicates the number of pre-fetches. This member dwCount is incremented by "1" each time a designative load pre-fetches vector data, and is decremented by "1" each time the vector loader 20 reads vector data.

dwStatus: Indicates a state of the cache page. The cache page state is one of FREE, ALLOCATED, USED, FILLED, and LOCKED.

lpBuf: A pointer indicating the start address of an entity (portion other than the header) for vector data in the cache page.

lpForward/lpBackward: In this embodiment, a plurality of VDDLCSPAGE structures forms a bidirectional linked list. Member lpForward is a pointer to the other VDDLCSPAGE structures available forward of the link. Member lpBackward is a pointer to the other VDDLCSPAGE structures available backward of the link.

lpNext: As mentioned above, the waveform generator may be implemented on dedicated hardware, for example. In such a case, a plurality of vector data to be used concurrently is divided into a plurality of cache pages. These cache pages form a "group". Member lpNext is a pointer for sequentially indicating the other VDDLCSPAGE structures belonging to the same group.

The aforementioned member dwCount has the following role. When the same vector data is used twice in a sequence of packet streams, for example, a designative load request occurs twice for that vector data. When the vector loader 20 reads the vector data for the first time, however, the corresponding cache page is set to the USED state, disabling the second reading. This problem is prevented by counting how many times the cache page should be read subsequently.

Incidentally, vector data is used more than once as follows. Namely, the same vector data is used more than once during a waveform synthesis process for the same event data or for a plurality of event data. In either case, this embodiment uses member dwCount to determine the number of uses for the vector data, making it possible to uniformly handle cache pages in the cache memory 44.

Figure 29:
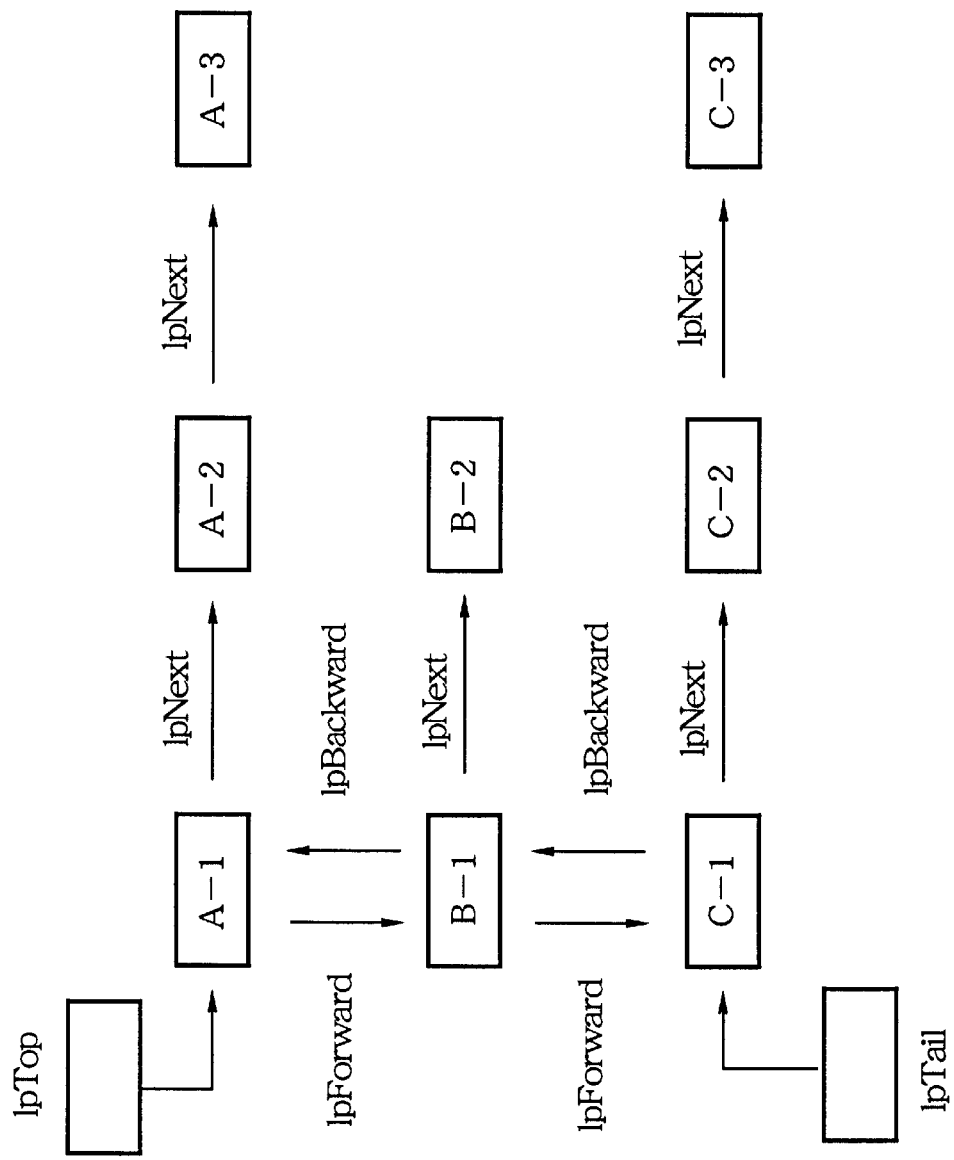
FIG. 29 shows the link structure of a page header in the cache memory.

(4.3) Link Structure of the Page Header (FIG. 29)

FIG. 29 shows the structure of a bi-directional linked list implemented by pointers lpForward and lpBackward. This embodiment employs a list structure as shown in the figure in order to freely and fast rearrange, add, or delete data.

In FIG. 29, A-1 is a page header positioned at the beginning of the bi-directional linked list. The beginning is pointed by a specified pointer lpTop and the end is pointed by pointer lpTail. A-2 and A-3 are page headers belonging to the same group as for the A-1. Namely, this "group" is equivalent to data of respective cache pages which are formed by dividing one file. The start address of page header A-2 is pointed by member lpNext of page header A-1. The start address of page header A-3 is pointed by member lpNext of page header A-2.

B-1 is a page header linked to the next stage of page header A-1. The start address of page header B-1 is pointed by member lpForward of page header A-1. Member lpNext of page header B-1 points to the start address of page header B-2 belonging to the same group. Member lpForward of page header B-1 points to the start address of page header C1 linked to the next stage. Member lpNext of each of page headers C-1 and C-2 points to the start address of each of page headers C-2 and C-3, respectively. Here, a cache page in the FREE state constitutes one group. For example, groups A and B are set to the FILLED state. Group C is set to the FREE state. When new vector data is to be cached, a cache page is obtained from a group in the FREE or USED state. That cache page is set to a cache page for new vector data.

It may be preferable to create a new cache page and a corresponding page header on the system memory and use it as a cache page for new vector data. In this case, it is desirable to limit the total amount of cache pages to a specified value for saving the memory resource. This specified value may be set automatically according to the system memory amount or manually by a user. When control is provided to always ensure a given constant value as the memory amount for a FREE-state group, it is possible to accelerate allocation of new vector data to a cache page.

According to the bi-directional linked list in FIG. 29, referencing members lpForward can forward trace the beginning page headers A-1, B-1, and C-1 for groups constituting the list. Referencing members lpBackward can backward trace the bi-directional linked list. In order to check whether or not given vector data is cached, it is preferable to sequentially trace beginning page headers constituting the list and to check if member dwID in a page header matches the same vector ID as the relevant vector data. If there is a match, a cache page associated with that page header is the beginning cache page for a group which caches that vector data. When a single page is always used to store all vector data to be used concurrently, the bi-directional linked list should comprise only page headers A-1, B-1, and C-1. Null data is stored in members lpNext for these page headers.

The aforementioned member dwStatus indicates cache page states as LOCKED≧FILLED>ALLOCATED>USED>FREE in the order of importance levels. When cache pages are sequenced in this order of importance levels, it is possible to accelerate allocation of a cache page to new vector data. Further, it may be preferable to reflect a value of member dwCount directly on the importance level. Namely, it is preferable to assign a higher importance level to a larger value of member dwCount. Between USED-state cache pages, it is preferable to assign a lower importance level to a cache page previously shifted to the USED state.

(5) Operations in the Read Control Section 43

Referring again to FIG. 28, the following describes operations in the read control section 43.

The vector loader 20 issues a command to the read control section 43 so as to read the cache memory 44 based on the packet stream content, i.e., based on the vector ID in each packet. This command is referred to as LockVector. This LockVector command is provided with a handle previously returned in response to the GetVector command. In a normal operation state, vector data should be stored in the cache memory 44. The LockVector command returns a pointer for the start address of a cache page associated with that vector data to the vector loader 20.

According to this operation, the vector loader 20 and the vector decoders 31 through 35 appropriately read the contents of the cache memory 44 for performing a waveform synthesis process. In this way, the LOCKED state (to be detailed) is applied to cache pages which can be ready by the vector loader 20, etc. for preventing contents thereof from being modified by other processes.

Depending on situations, however, necessary vector data may not be loaded into the cache memory 44 when the LockVector command is received from the vector loader. Such a situation may often occur when a personal computer application program implements the waveform generator according to this embodiment. This is because the hard disk 109 is occupied for a relatively long time depending on conditions of the personal computer's operating system. In this case, different processes are performed according to the waveform generator's operation modes.

When a waveform synthesis is performed non-realtime, it is preferable to stop subsequent processes until specified vector data is loaded. For this purpose, the read control section 43 performs a synchronous read operation for the hard disk 109. This synchronous read operation means that no other processes should be performed until intended data is read.

When the waveform generator operates realtime, performing a synchronous read operation may interrupt a musical sound. A pointer for an substitutive page is returned to the vector loader 20. This embodiment uses various types of vector data for faithfully expressing diverse timbre changes. When a timbre selected by the program change is limited to a vector for basic sounding without a performance style expression, etc., its capacity is not so large. The RAM 103 stores a plurality of such vectors as default vectors for that timbre. These vectors substitute for vector data which cannot be prepared in the cache memory 44.

Even if the realtime synthesis is performed, there may be a case where a sufficient time delay is ensured for the waveform synthesis process S14 (waveform synthesis section 101D), making it possible to load necessary vectors and synthesize a waveform within that range. In this case, like the non-realtime waveform synthesis, a waveform synthesis can be performed by immediately reading the corresponding vector data when it is found that necessary vector data is not loaded. When the vector loader 20 and the vector decoders 31 through 35 finish using a cache page, the vector loader 20 supplies the read control section 43 with a handle-attached Release command with respect to that cache page. Supplying this Release command cancels the LOCKED state of the cache page and releases the handle.

(6) State Transition Operations for Cache Pages

Figure 30:
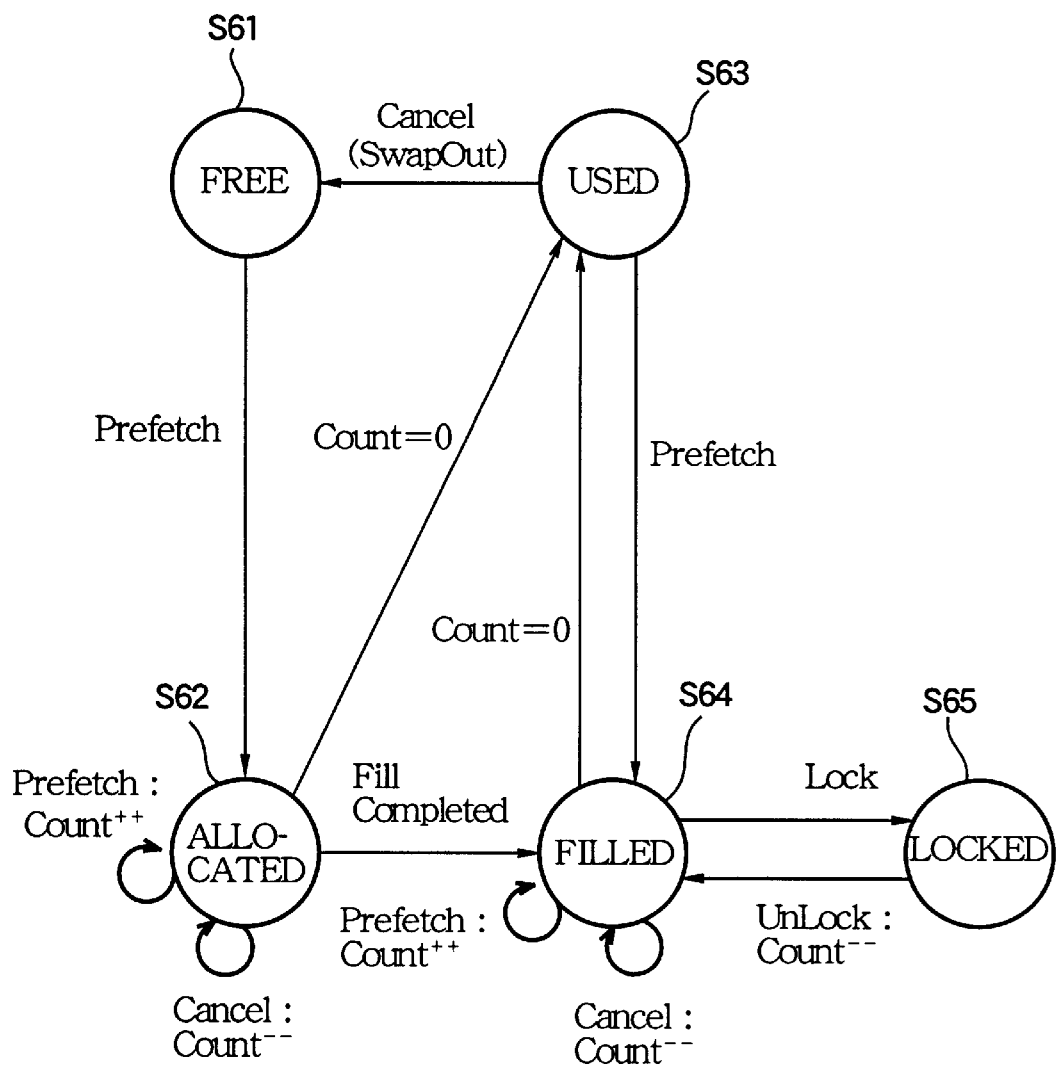
FIG. 30 is a state transition diagram between pages in the cache memory.

The following describes operations for state transition of each cache page with reference to the state transition diagram in FIG. 30.

Initially, all cache pages are set to the FREE state (S61). Namely, the cache page's header contains member dwStatus set to 'FREE'. This means that the cache page is unused and its content is not assured. When vector data is loaded into the cache page, this cache page is set to the ALLOCATED state (S62). The ALLOCATED state means that data has not been stored but is reserved for a data read operation from the code book 26. At this time, "1" is stored in member dwCount.

When vector data is stored in that page afterwards, the cache page state changes to FILLED. Member dwCount is incremented by "1" each time a designative load request occurs for the same vector data in the ALLOCATED or FILLED state. Member dwCount is decremented by "1" each time a predictive load request is canceled (step S55 for the load process in FIG. 25) in the ALLOCATED or FILLED state. When the value of member dwCount becomes "0" in these states, the cache page is set to the USED state (S63).

After the cache page changes to the FILLED state, the vector loader 20 supplies a LockVector command to set the cache page to the LOCKED state (S65). The LOCKED state is released (unlocked) when the vector loader 20 and the vector decoders 31 through 35 finish using the cache page and a Release command is issued. The cache page is set to the FILLED state (S64) again. At this time, member dwCount for the cache page is decremented by "1". When member dwCount becomes "0", the cache page is immediately set to the USED state (S63).

After the cache page is set to the USED state, a predictive load request or a designative load request (pre-fetch) may recur for that cache page. In this case, the cache page is returned to the FILLED state again. As the aforementioned process continues, USED-state cache pages increase and FREE-state cache pages decrease in the cache memory 44. After there remains no cache page in the FREE state, pre-fetching new vector data sequentially cancels (SwapOut) USED-state cache pages from the earliest first and returns that cache page to the FREE state (S61). This cache page returned to the FREE state is set to the ALLOCATED state for loading the aforementioned new vector data.

It is preferable to use the bi-directional linked list described in FIG. 29 as a method of promptly specifying the earliest cache page in the USED state. When a cache page is set to the USED state, this cache page is added to the beginning of the linked list. When FREE-state cache pages become insufficient, a cache page is detached from the end of the linked list and is changed to the FREE state.

(7) Time Management Section 45

The time management section 45 controls timings of the overall waveform synthesis section 101D. The following outlines the timing control in this embodiment with reference to FIG. 31.

FIG. 31 assumes that a reproduction is instructed to start at time t30 (e.g., a PLAY button pressed by the user) and an actual musical sound output starts at time t40. A time period between the times t30 and t40 is called latency β. Latency β is set to 2,000 msec for example, but need not be specified especially.

When the reproduction is instructed to start, the CPU 101 generates a reproduction thread every specified time. The reproduction thread allows song data to be read. According to its content, a pre-fetch process is performed for the hard disk 109, etc. There is a time period from time t32 when given song data is read to time t40 when actual sounding starts. This time period is called advanced time γ. It is preferable to set the reference value of advanced time γ to, e.g., approximately 4,000 msec and vary it within the range from 1,000 to 10,000 msec depending on processing situations.

When advanced time γ is ensured to some extent, it is possible to intermittently generate reproduction threads and read song data intermittently (in given blocks of data). An interval for generating reproduction threads is called reproduction thread generation interval ε. It is preferable to set the reference value of reproduction thread generation interval ε to, e.g., 20 msec and vary it within the range from 5 to 100 msec depending on processing situations.

When song data is read at time t32, part of the song data is retrieved at step S11 as mentioned above. The score is interpreted at step S12. Then, a performance synthesis is performed at step S13. As a result, vector data is pre-fetched at time 34. A time period from pre-fetch time t34 to sounding start time t40 is called pre-fetch time α.

The vector data read from the hard disk 109 is finally written to the cache memory 44. Thereafter, the vector loader 20 reads that vector data from the cache memory 44 via the read control section 43 to start the waveform synthesis. A time period from waveform synthesis start time t36 to sounding start time t40 is called output latency δ. It is preferable to set the reference value of output latency δ to, e.g., approximately 300 msec and vary it within the range from 10 to 1,000 msec depending on processing situations.

Like reproduction threads, it is also suitable to intermittently perform a given bunch of waveform synthesis processes within a specified time range. It is preferable to set the reference value of an interval for starting the waveform synthesis process to, e.g., 50 msec and vary it within the range from 10 to 500 msec depending on processing situations.

As will be apparent from FIG. 31, there is the relationship "γ>α>δ" among advance time γ, pre-fetch time α, and output latency δ. Here, time interval "α−δ" from prefetch time t34 to waveform synthesis start time t36 needs to be long enough to load vector data from the hard disk 109. When the amount of vector data to be loaded causes a high peak value, it is possible to prevent a noise from occurring etc. by increasing this time interval "α−δ".

4. Modifications

The present invention is not limited to the aforementioned embodiment. For example, various modifications may be made as follows.

(1) When the aforementioned waveform generator is used for an electronic musical instrument, this electronic musical instrument may be available in any form such as a stringed instrument, a wind instrument, a percussion instrument, etc. In this case, the present invention is not limited to a single electronic musical instrument which includes the song data reproduction section 101A, the score interpretation section 101B, the performance synthesis section 101C, the waveform synthesis section 101D, etc. Of course, the present invention is applicable to separate components which are configured to connect with each other through the use of communication means such as a MIDI interface, various networks, etc. The configuration may comprise a personal computer and application software. In this case, it may be preferable to supply a processing program stored on recording media such as optical disks, semiconductor memory, etc., or via networks. Further, the present invention may be applied to automatic performance apparatuses such as a player piano.

(2) In the aforementioned embodiment, a single cache page stores a plurality of vector data. Obviously, a single cache page may store one piece of vector data.

(3) The aforementioned embodiment determines cache pages to be shifted to the USED state by incrementing or decrementing member dwCount in the cache page header. When unused cache pages increase, however, this method may cause the cache memory 44 to become insufficient. In this case, it may be preferable to define "priorities" for FILLED-state cache pages and sequentially shift FILLED-state cache pages with low priorities to the USED state, then to the FREE state. When a LockVector command is received from the vector loader 20 for a cache page shifted to the FREE state, the aforementioned substitutive page is used. As an example of "priorities", a value for member dwCount may be used as is (on the premise that the larger the value is, the higher the priority takes effect). Further, it may be preferable to allow for the number of past uses of the cache page or a maximum value for member dwCount (a maximum value in the history).

(4) In the aforementioned embodiment, the bidirectional linked list is used to combine USED-state cache pages. When FREE-state cache pages become insufficient, a cache page at the end of the lined list is released sequentially (from the earliest first) and is changed to the FREE state. However, the sequence for shifting to the FREE state is not limited thereto. For example, shifting to the FREE state may be preferably avoided with respect to cache pages having a large accumulated number of uses, cache pages with a large maximum value in the history of member dwCount, or vector data used at the beginning of each module. In other words, these cache pages or vector data may be configured to remain in the cache memory 44, if possible. Alternatively, it may be preferable to cache the actually used vector data in preference to vector data which is not used actually (due to failed prediction).

The hard disk 109 can operate with an increased access capability by preferentially caching vector data used at the beginning of a module, decreasing the necessity to use substitutive pages.

Specifically, when a cache page to be cached preferentially needs to be shifted to the USED state, it is preferable to add that cache page to the beginning of the linked list. When the other cache pages need to be shifted to the USED state, it is preferable to add these cache pages to the middle of the linked list.

(5) In the aforementioned embodiment, vector data is used as an example of sound data. However, the sound data is not limited to vector data. Of course, it may be preferable to use various waveform data or parameters for specifying musical sound waveforms as sound data.

(6) In the aforementioned embodiment, as shown in FIGS. 15 through 23, the performance synthesis section 101C inputs a packet stream directly to the pre-fetch section 42. Instead of this operation, the pre-fetch section 42 may read packet streams temporarily written in the packet queue buffers 21 through 25. In this case, it is preferable that the prefetch section 42 reads and processes a packet stored in the packet queue buffer at a specified time before the vector loader 20 does the same.

As mentioned above, according to the first aspect of the invention, the music apparatus receives a timbre specification or one of first to third sound data specifications, predicts a candidate of sound data to be specified subsequently, and transfers that candidate from a low-speed storage device to a high-speed storage device in advance. Accordingly, it is possible to promptly process the first to third sound data specifications while storing a large amount of sound data in the low-speed storage device. This makes it possible to realtime reproduce sound data for waveform synthesis with rich expression.

As mentioned above, according to the second aspect of the invention, the synthesis method makes it possible to determine whether or not sound data transferred to a high-speed storage device is used in the future based on an associated count value. When the sound data is actually used later on, it is unnecessary to access a low-speed storage device such as a hard disk etc. This can decrease the frequency of accessing the low-speed storage device such as a hard disk etc.

As mentioned above, according to the third aspect of the invention, the present method can realtime generate high-quality waveforms in consideration of playing styles or articulations for musical sounds by using a compact storage capacity. Namely, generated vector data is corrected according to playing style parameters. This eliminates the need to store vector data corresponding to variations of many musical performance modes (playing styles), thereby saving a storage capacity for preliminarily storing vector data. Further, it is possible to finely control characteristics of performance sound waveforms based on common playing style identification information in accordance with playing style parameters, thereby improving controllability.

In this way, it is possible to use high-quality waveforms having characteristics of diverse playing style (or articulation). These waveforms include a waveform provided with the modulation such as vibrato and tremolo, a waveform provided with the pitch modulation such as bend, a slurred waveform, a waveform provided with the passing pitch variation such as a passing tone or an ornament. The utilization of high-quality waveforms can be further improved by simply combining such high-quality waveforms for free waveform generation. There is provided an excellent effect of realtime generating high-quality waveforms in consideration of playing styles or articulations in the manner of improved controllability and editability.

According to the fourth aspect of the invention as mentioned above, after sound data is used for waveform synthesis, the used data is stored in the aforementioned high-speed storage device in a state capable of use in the future. When that sound data is actually used later on, it is unnecessary to access a low-speed storage device such as a hard disk. This can decrease the frequency of accessing the low-speed storage device such as a hard disk.

What is claimed is:

1. A method for synthesis of a musical sound by means of a first storage device storing sound data representative of waveforms of various musical sounds, said first storage device accessible at a first access rate, and a second storage device caching the sound data at a second access rate faster than the first access rate for instantly providing sound data representative of a waveform of a musical sound to be synthesized, the method comprising the steps of:
   appointing sound data for preparation of the synthesis of the musical sound, the appointed sound data including sound data representing waveforms determined or predicted for use in the synthesis;
   instructing a start of the synthesis based on the sound data which are cached in the second storage device and which may or may not contain the appointed sound data;
   transferring the appointed sound data with an associated count to the second storage device from the first storage device when the appointed sound data has not been cached, the associated count being set to an initial value;
   incrementing a current value of the associated count of the appointed sound data when the appointed sound data has already been cached;
   executing the synthesis of the musical sound in response to the start instruction using the appointed and cached sound data;
   decrementing a current value of the associated count of the appointed and cached sound data in the synthesis; and
   detecting releasable sound data in the second storage device according to the value of the associated count.

2. The method according to claim 1, further comprising the step of sequentially retrieving event data representative of each musical sound in advance to the synthesis of each musical sound, wherein the appointing step appoints the sound data according to the sequentially retrieved event data such that the sound data may be appointed commonly for a plurality of the event data, and the transferring step transfers the commonly appointed sound data at once to the second storage device.

3. The method according to claim 2, further comprising the step of setting a time lag between the retrieval of the event data and the synthesis of the corresponding musical sound such that the retrieving step can sequentially retrieve a plurality of the event data within the set time lag, and the appointing step can appoint the sound data common to the plurality of the event data during the set time lag.

4. The method according to claim 1, wherein the appointing step may appoint the same sound data two or more times according to the retrieved event data, the incrementing step increments the current value of the cached sound data every time the same sound data is appointed, and the decrementing step decrements the current value of the associated count of the cached sound data every time the same sound data is used for the synthesis of the event data.

5. The method according to claim 1, wherein the first storage device is provided in the form of a hard disk drive, and the second storage device is provided in the form of a random access memory chip.

6. A computer program executable for performing the method for synthesis of a musical sound according to claim 1.

7. A method for synthesis of a musical sound by means of a first storage device storing vector data representative of waveforms of various musical sounds, said first storage device accessible at a first access rate, and a second storage device caching the vector data at a second access rate faster than the first access rate for instantly providing vector data representative of a waveform of a musical sound to be synthesized, the method comprising the steps of:
   receiving a stream of packets for reproducing the musical sound continuously along a time axis, each packet containing identification information effective to identify vector data stored in the first storage device for the synthesis and timing information effective to specify a timing of the synthesis along the time axis;
   transferring the identified vector data from the first storage device to the second storage device before the specified timing, such that the identified vector data can be timely cached in the second storage device in advance of the synthesis;
   retrieving the cached vector data from the second storage device when the specified timing is reached so as to synthesize waveforms defined by the retrieved vector data into the musical sound.

8. The method according to claim 7, further comprising the step of determining whether or not the vector data identified by the received packet has been already cached in the second storage device, such that the transferring step executes the transferring of the identified vector data provided that the determining step determines that the second storage device has not stored the identified vector data.

9. The method according to claim 7, further comprising the steps of detecting when the second storage device does not have a free area sufficient for accepting new vector data to be transferred to the second storage device, and releasing old vector data from the second storage device to yield the free area for accepting the new vector data, the released old vector data including vector data which is already used in previous synthesis and vector data which remains unused in previous synthesis.

10. The method according to claim 7, wherein the first storage device is provided in the form of a hard disk drive, and the second storage device is provided in the form of a random access memory chip.

11. A computer program executable for performing the method for synthesis of a musical sound according to claim 7.

12. A method for synthesis of a musical sound by means of a first storage device storing sound data representative of waveforms of various musical sounds, said first storage device accessible at a first access rate, and a second storage device caching the sound data at a second access rate faster than the first access rate for instantly providing sound data representative of a waveform of a musical sound to be reproduced, the method comprising the steps of:

receiving a sequence of sounding instructions for producing the musical sounds in a continuous manner, each sounding instruction designating sound data representative of a waveform for use in the synthesis of the musical sound;

transferring the designated sound data from the first storage device to the second storage device for caching in response to each of the received sounding instructions;

retrieving the cached sound data from the second storage device for use in the synthesis; and retaining the sound data used in a synthesis corresponding to a preceding sounding instruction for reuse in another synthesis corresponding to a succeeding sounding instruction.

13. The method according to claim 12, wherein the transferring step periodically transfers the sound data in a predetermined amount sufficient to produce the musical sound in the continuous manner.

14. The method according to claim 12, further comprising the steps of detecting when the second storage device does not have a free area sufficient for accepting new sound data to be transferred to the second storage device, and releasing old sound data from the second storage device to yield the free area for accepting the new sound data.

15. The method according to claim 14, wherein the sound data are used for synthesizing a waveform of the musical sound having a predetermined length, the sound data containing significant sound data used for synthesis of a leading portion of the predetermined length of the waveform and non-significant sound data used for synthesis of remaining portions of the predetermined length of the waveform, and wherein the releasing step releases the non-significant sound data more easily as compared to the significant sound data.

16. The method according to claim 12, wherein the first storage device is provided in the form of a hard disk drive, and the second storage device is provided in the form of a random access memory chip.

17. A computer program executable for performing the method for synthesis of a musical sound according to claim 12.

18. An apparatus for synthesis of a musical sound comprising:

a first storage device that stores sound data representative of waveforms of various musical sounds, said first storage device accessible at a first access rate;

a second storage device that caches the sound data at a second access rate faster than the first access rate; and a controller that controls transfer of the sound data from the first storage device to the second storage device for synthesis of the musical sound, wherein the controller comprises:

an appointing section for appointing sound data for preparation of the synthesis of the musical sound, the appointed sound data including sound data representing waveforms determined or predicted for use in the synthesis;

an instructing section for instructing a start of the synthesis based on the sound data which are cached in the second storage device and which may or may not contain the appointed sound data;

a transferring section for transferring the appointed sound data with an associated count to the second storage device from the first storage device when the appointed sound data has not been cached, the associated count being set to an initial value;

an incrementing section for incrementing a current value of the associated count of the appointed sound data when the appointed sound data has already been cached;

an executing section for executing the synthesis of the musical sound in response to the start instruction using the appointed and cached sound data;

a decrementing section for decrementing a current value of the associated count of the appointed and cached sound data in the synthesis; and a detecting section for detecting releasable sound data in the second storage device according to the value of the associated count.

19. An apparatus for synthesis of a musical sound comprising:

a first storage device that stores vector data representative of waveforms of various musical sounds, said first storage device accessible at a first access rate;

a second storage device that caches the vector data at a second access rate faster than the first access rate; and a controller that controls transfer of the vector data from the first storage device to the second storage device for synthesis of musical sound, wherein the controller comprises:

a receiving section for receiving a stream of packets for reproducing the musical sound continuously along a time axis, each packet containing identification information effective to identify vector data stored in the first storage device for the synthesis and timing information effective to specify a timing of the synthesis along the time axis;

a transferring section for transferring the identified vector data from the first storage device to the second storage device before the specified timing, such that the identified vector data can be timely cached in the second storage device in advance of the synthesis;

a retrieving section for retrieving the cached vector data from the second storage device when the specified timing is reached so as to synthesize waveforms defined by the retrieved vector data into the musical sound.

20. An apparatus for synthesis of a musical sound comprising:

a first storage device that stores data representative of waveforms of various musical sounds, said first storage device accessible at a first access rate;

a second storage device that caches the sound data at a second access rate faster than the first access rate; and a controller that controls transfer of the sound data from the first storage device to the second storage device for synthesis of the musical sound, wherein the controller comprises:

a receiving section for receiving a sequence of sounding instructions for producing the musical sounds in a continuous manner, each sounding instruction designating sound data representative of a waveform for use in the synthesis of the musical sound;

a transferring section for transferring the designated sound data from the first storage device to the second storage device for caching in response to each of the received sounding instructions;

a retrieving section for retrieving the cached sound data from the second storage device for use in the synthesis; and a retaining section for retaining the sound data used in a synthesis corresponding to a preceding sounding instruction for reuse in another synthesis corresponding to a succeeding sounding instruction.

21. A method for synthesis of a musical sound by means of a first storage device storing vector data representative of waveforms of various musical sounds, said first storage device accessible at a first access rate, and a second storage device caching the vector data at a second access rate faster than the first access rate for instantly providing vector data representative of a waveform of a musical sound to be synthesized, the method comprising the steps of:

receiving a stream of packets including a preceding packet and a succeeding packet for reproducing the musical sound continuously along a time axis, each packet containing identification information effective to specify vector data stored in the first storage device;

predicting vector data of the succeeding packet according to the identification information contained in the preceding packet;

transferring the predicted vector data from the first storage device to the second storage device before the succeeding packet is received such that the predicted vector data can be cached in the second storage device in advance to the synthesis; and retrieving the cached vector data from the second storage device when the succeeding packet is received and the identification information contained therein hits the cached vector data to thereby synthesize the musical sound.

22. The method according to claim 21, further comprising the step of transferring vector data specified by the identification information contained in the succeeding packet from the first storage device to the second storage device when the cached vector data is not hit, thereby ensuring the continuous synthesis of the musical sound.

23. The method according to claim 21, wherein the first storage device stores the vector data classified into first vector data representing an attack waveform corresponding to a leading portion of a musical sound, and second vector data representing a body waveform corresponding to a subsequent portion of the same musical sound, such that the step of predicting predicts whether the second vector data representative of the body waveform which is connectable to the attack waveform specified by the first vector data contained in the preceding packet.

24. The method according to claim 23, wherein the first storage device further stores third vector data representing a release waveform or a joint waveform subsequent to a body waveform of the musical sound, such that the step of predicting predicts whether the third vector data representative of the release waveform or the joint waveform is connectable to the body waveform specified by the first vector data contained in the preceding packet.

25. The method according to claim 21, further comprising the step of applying a releasable status to the cached vector data which has not been hit, such that the cached vector data of the releasable status can be erased from the second storage device before a further packet is received.

26. The method according to claim 21, wherein the first storage device is provided in the form of a hard disk drive, and the second storage device is provided in the form of a random access memory chip.

27. A computer program executable for performing the method according to claim 21.

28. An apparatus for synthesis of a musical sound comprising:

a first storage device that stores vector data representative of waveforms of various musical sounds, said first storage device accessible at a first access rate;

a second storage device that caches the vector data at a second access rate faster than the first access rate for instantly providing vector data representative of a waveform of musical sound to be synthesized; and a processor that controls transfer of the vector data from the first storage device to the second storage device and acquires the vector data from the second storage device for synthesis of the musical sound, wherein the processor comprises:

a receiving section for receiving a stream of packets including a preceding packet and a succeeding packet for reproducing the musical sound continuously along a time axis, each packet containing identification information effective to specify vector data stored in the first storage device;

a predicting section for predicting vector data of the succeeding packet according to the identification information contained in the preceding packet;

a transferring section for transferring the predicted vector data from the first storage device to the second storage device before the succeeding packet is received such that the predicted vector data can be cached in the second storage device in advance to the synthesis; and a retrieving section for retrieving the cached vector data from the second storage device when the succeeding packet is received and the identification information contained therein hits the cached vector data to thereby synthesize the musical sound.

* * * * *